US008501902B2

(12) United States Patent
Tierney et al.

(10) Patent No.: US 8,501,902 B2
(45) Date of Patent: Aug. 6, 2013

(54) PROCESS FOR THE POLYMERISATION OF THIOPHENE OR SELENOPHENE COMPOUNDS

(75) Inventors: Steven Tierney, Southampton (GB); Martin Heeney, Southampton (GB); Weimin Zhang, Southampton (GB); Simon Higgins, Liverpool (GB); Iain Liversedge, Charlotte, NC (US)

(73) Assignee: Merck Patent GmbH, Darmstadt (DE)

( * ) Notice: Subject to any disclaimer, the term of this patent is extended or adjusted under 35 U.S.C. 154(b) by 1143 days.

(21) Appl. No.: 11/504,114

(22) Filed: Aug. 15, 2006

(65) Prior Publication Data
US 2007/0045592 A1    Mar. 1, 2007

(30) Foreign Application Priority Data

Aug. 16, 2005  (EP) .................................. 05017718
Feb. 9, 2006   (EP) .................................. 06002595

(51) Int. Cl.
*C08G 79/08*        (2006.01)

(52) U.S. Cl.
USPC ........... 528/394; 528/373; 528/377; 528/391; 528/396; 252/500; 252/299.61

(58) Field of Classification Search
USPC ................... 252/500, 299.61; 528/377, 394, 528/396, 373, 391
See application file for complete search history.

(56) References Cited

U.S. PATENT DOCUMENTS

| | | | |
|---|---|---|---|
| 5,198,153 | A | 3/1993 | Angelopoulos et al. |
| 5,892,244 | A | 4/1999 | Tanaka et al. |
| 5,998,804 | A | 12/1999 | Suh et al. |
| 7,173,103 | B2 * | 2/2007 | Towns et al. .................. 528/394 |
| 2003/0062536 | A1 * | 4/2003 | Heeney et al. ............. 257/183.1 |
| 2004/0171833 | A1 * | 9/2004 | Buchwald et al. ............... 546/22 |
| 2005/0090640 | A1 * | 4/2005 | Heeney et al. ................ 528/377 |

FOREIGN PATENT DOCUMENTS

| | | |
|---|---|---|
| EP | 0 889 350 A1 | 1/1999 |
| EP | 1 498 112 A3 | 1/2005 |
| EP | 1 510 535 | 3/2005 |
| WO | 96/21659 | 7/1996 |
| WO | 99/20675 | 4/1999 |
| WO | WO99/20675 * | 4/1999 |
| WO | 00/53656 | 9/2000 |
| WO | 00/79617 A1 | 12/2000 |
| WO | 03/035713 A1 | 5/2003 |
| WO | WO03/035796 * | 5/2003 |
| WO | 03/048225 A2 | 6/2003 |
| WO | 2005/111045 | 11/2005 |
| WO | 2006/021277 | 3/2006 |
| WO | 2006/094645 | 9/2006 |

OTHER PUBLICATIONS

Efficient solid-phase synthesis of regioregular head-to-tail-coupled oligo(3-alkylthiophene), Kirschbaum et al., Journal of the Chemical Society, Mar. 2000.*
Systhesis and Characterization of Dimer, Trimers, and Tetramers of 3,6-Dimethylthieno[3,2-b]thuophene, Nakayama et al., Tetrahedron, vol. 52, 1996, pp. 471-488.*
Mechanistic Aspects of the Suzuki Polycondensation of Thiophenebisboronic Derivatives and Diiodobenzenes, Jayakannan et al., Macromolecules 2001, 34, pp. 5386-5393.*
Air-Stable Trialkylphosphonium Salt , Netherton et al.—Organic Letters, vol. 3, No. 26, 2001. pp. 4295-4298.*
European Search Report (EPO Form 1503) issued Dec. 7, 2006 in EP 06 01 4918.

* cited by examiner

*Primary Examiner* — Mark Kopec
*Assistant Examiner* — Haidung Nguyen
(74) *Attorney, Agent, or Firm* — Millen, White, Zelano & Branigan, P.C.

(57) ABSTRACT

The invention relates to a process for coupling thiophene or selenophene compounds, in particular for preparing conjugated thiophene or selenophene polymers with high molecular weight and high regioregularity, and to novel polymers prepared by this process. The invention further relates to the use of the novel polymers as semiconductors or charge transport materials in optical, electrooptical or electronic devices including field effect transistors (FETs), thin film transistors (TFT), electroluminescent, photovoltaic and sensor devices. The invention further relates to FETs and other semiconducting components or materials comprising the novel polymers.

47 Claims, No Drawings

PROCESS FOR THE POLYMERISATION OF THIOPHENE OR SELENOPHENE COMPOUNDS

FIELD OF INVENTION

The invention relates to a process for coupling thiophene or selenophene derivatives, in particular for preparing conjugated thiophene or selenophene polymers with high molecular weight and high regioregularity, and to novel polymers prepared by this process. The invention further relates to the use of the novel polymers as semiconductors or charge transport materials in optical, electrooptical or electronic devices including field effect transistors (FETs), thin film transistors (TFT), electroluminescent, photovoltaic and sensor devices. The invention further relates to FETs and other semiconducting components or materials comprising the novel polymers.

BACKGROUND AND PRIOR ART

Organic materials have shown promise as the active layer in organic based thin film transistors and organic field effect transistors (OFETs). Such devices have potential applications in smart cards, security tags and the switching element in flat panel displays. Organic materials are envisaged to have substantial cost advantages over their silicon analogues if they can be deposited from solution, as this enables a fast, large-area fabrication route.

The performance of the device is principally based upon the charge carrier mobility of the semiconducting material and the current on/off ratio, so the ideal semiconductor should have a low conductivity in the off state, combined with a high charge carrier mobility ($>1 \times 10^{-3}$ cm$^2$ V$^{-1}$ s$^{-1}$). In addition, it is important that the semiconducting material is relatively stable to oxidation i.e. it has a high ionisation potential, as oxidation leads to reduced device performance.

A suitable semiconducting material known from prior art is regioregular head-to-tail (HT) poly-(3-alkylthiophene) (P3AT), such as poly-(3-hexylthiophene) (P3HT). It shows a high charge carrier mobility, a good solubility in organic solvents, and is solution processable to fabricate large area films.

The synthesis of regioregular polythiophene is well reported in the literature by a variety of methods including Grignard metathesis [1], Rieke coupling [2], Stille coupling [3], and Suzuki coupling [4]. Further methods can be used to obtain regioregular polythiophenes only when the monomer employed is symmetrical, namely Yamamoto coupling [5] and oxidative polymerisation [6]. However, these methods currently suffer from some drawbacks, particularly when synthesising copolymers comprising at least two thiophene-based monomers.

The Grignard metathesis, Rieke coupling, Yamamoto coupling, and oxidative polymerisation methods are all only applicable to the synthesis of regioregular homopolymers based upon a single monomer unit. These synthetic approaches are therefore not applicable to the preparation of alternating copolymers. Furthermore, the Grignard metathesis so far has proven to be useful only for the synthesis of P3AT.

On the other hand, the Stille and Suzuki coupling methods are amenable to the preparation of both regioregular homopolymers and alternating copolymers, but yet each suffers from a critical obstacle.

In the case of the Stille coupling, a main obstacle is the toxicity of organotin compounds. Typically either tributylstannyl or trimethylstannyl thiophene derivatives are employed in the polymerisation. These monomers are prepared from a trialkyltin halide, in particular trimethyltin halide, which is highly toxic. The trialkyltin halide is also re-generated during the polymerisation. The toxicity issue is disadvantageous especially in the large-scale preparation of polythiophenes via this route.

For the Suzuki coupling, the current obstacles are the low molecular weight polythiophenes obtained [7] and/or the low yields [4,7]. This is due to significant deboronation of thiophene boronate esters/acids occurring during the reaction [7], which typically limits the molecular weights obtained.

The molecular weights of polythiophenes have a direct effect on their thin-film morphology and consequently on their field-effect mobility as observed for P3HT [8]. In addition, it was reported that the performance of (bulk heterojunction) solar cells depends on the molecular weights of P3HT used in the device [9]. Thus, it is critical to be able to synthesise high molecular weight polythiophenes, in order for them to be an attractive candidate for application in electronic devices, such as FETs and solar cells.

The prior art [10, 11, 12] also discloses Suzuki coupling methods that yield high molecular weight polymers ($M_n$>100,000 Da) in good yields, for example for 9,9-dialkylfluorene based copolymers. However, these methods do not yield polythiophenes with high molecular weights and in high yields.

Therefore, there is still a need for an improved method of preparing thiophene polymers with high regioregularity, high molecular weight, high purity and high yields in an economical, effective and environmentally beneficial way, which is especially suitable for industrial large scale production.

It is an aim of the present invention to provide an improved process for preparing thiophene polymers with these advantages, but not having the drawbacks of prior art methods mentioned above. Other aims of the present invention are immediately evident to the person skilled in the art from the following detailed description.

It was found that these aims can be achieved with a process as claimed in the present invention. This process enables coupling thiophene and selenophene compounds and is especially suitable for synthesising conjugated polymers of thiophene or selenophene with high molecular weight and high regioregularity. The polymers obtained by this process are useful as semiconducting component especially in the fabrication of FETs and TFTs.

SUMMARY OF THE INVENTION

The invention relates to a process for polymerising a heteroaromatic compound under formation of aryl-aryl C—C couplings, wherein said compound has at least one functional halide group and at least one functional boron group, or copolymerising at least one first and at least one second heteroaromatic compound under formation of aryl-aryl C—C couplings, wherein said first compound has at least two functional halide groups and said second compound has at least two functional boron groups, wherein the polymerisation is carried out in presence of
a) a catalyst/ligand system comprising a palladium catalyst and an organic phosphine or phosphonium compound,
b) a base,
c) a solvent or a mixture of solvents,
characterized in that
the functional halide and boron groups are attached to a thiophene or selenophene ring that is optionally substituted and optionally fused to another ring, and the organic phosphine or phosphonium compound is a trisubstituted phosphine or phosphonium salt with substituents selected from optionally substituted alkyl and aryl groups.

The invention further relates to novel conjugated polymers and copolymers obtainable or obtained by a process as described above and below.

The invention further relates to a semiconductor or charge transport material, component or device comprising one or more polymers as described above and below.

The invention further relates to the use of a material, polymer, component or device according to the present invention as charge-transport, semiconducting, electrically conducting, photoconducting or light-emitting material in optical, electrooptical, electronic semiconducting or electroluminescent (EL) components or devices, organic field effect transistors (OFET), integrated circuits (IC), thin film transistors (TFT), flat panel displays, radio frequency identification (RFID) tags, electroluminescent or photoluminescent devices or components, organic light emitting diodes (OLED), backlights of displays, photovoltaic or sensor devices, charge injection layers, Schottky diodes, planarising layers, antistatic films, conducting substrates or patterns, electrode materials in batteries, photoconductors, electrophotographic applications, electrophotographic recording, organic memory devices, alignment layers, cosmetic or pharmaceutical compositions, biosensors, biochips, security markings, polymerisable liquid crystal materials, liquid crystal polymers, anisotropic polymer films with charge transport properties or methods or devices for detecting and discriminating DNA sequences.

The invention further relates to an optical, electrooptical or electronic device, OFET, IC, TFT, TFT array for flat panel displays, RFID tag, OLED, EL display, backlight or alignment layer comprising a material, polymer, component or device according to the present invention.

DETAILED DESCRIPTION OF THE INVENTION

Above and below, the term "functional group" refers to a group which is capable of reacting in a Suzuki coupling reaction with another group to produce an aryl-aryl C—C bond. The functional groups are selected from a first type A which is, for example, a halide group, and a second type B which is, for example, a boron group. Compounds having one such functional group (of type A or B) attached to an aromatic core are also referred to as "monofunctional compounds". Compounds having two or more of such functional groups (of type A and/or B) attached to an aromatic core are also referred to as "di- or multifunctional compounds". Di- or multifunctional compounds can comprise the same or different types of functional groups and are accordingly referred to as "AA-, BB-, AB-type compounds".

The term "functional halide group" means a group preferably selected from halogen or a sulfonyloxy group. Very preferred halide groups are Cl, Br, I or a sulfonyloxy group of the formula —OSO$_2$R$^x$, wherein R$^x$ is optionally fluorinated alkyl preferably having 1 to 12 C atoms, or optionally fluorinated aryl preferably having up to 12 C atoms and which is optionally substituted by alkyl having 1 to 4 C atoms. Examples of R$^x$ groups include methyl, trifluoromethyl or 4-methylphenyloxy, so that the sulfonyloxy group is accordingly mesylate, triflate or tosylate. Especially preferred functional halide group are Br or I.

The term "functional boron group" means a boronic acid, boronic acid ester (boronate) or borane group. The boron group is preferably of the formula —B(OR')(OR"), wherein R' and R" are independently of each other H or alkyl with 1 to 12 C-atoms, or R' and R" together form an optionally substituted cyclic aliphatic or aromatic group, especially an alkylene or arylene group having 2 to 20 C atoms. Especially preferred groups are selected from boronic acid, boronic acid esters of monofunctional C$_1$-C$_6$ alcohols, or boronic acid esters of difunctional alcohols like ethanediols, pinacol, propane diols or ortho aromatic diols like 1,2-dihydroxybenzene. The borane group is preferably of the formula —BR'R", wherein R' and R" are as defined above. Very preferred are the following groups

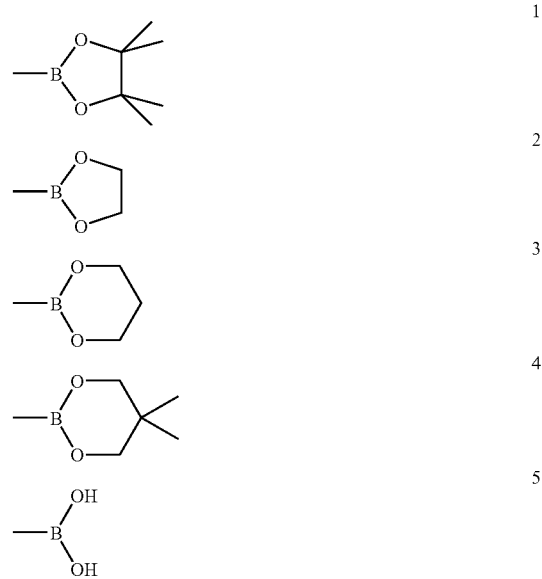

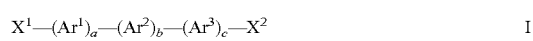

The thiophene or selenophene compounds that are used as monomers in the process according to the present invention are preferably selected of formula I $$X^1-(Ar^1)_a-(Ar^2)_b-(Ar^3)_c-X^2 \qquad I$$

wherein

Ar$^1$ and Ar$^3$ are, in case of multiple occurrence independently of one another, identical or different arylene or heteroarylene groups, which are optionally substituted with one or more groups R, optionally comprise fused rings, and comprise a thiophene ring or a selenophene ring linked to X$^1$ and/or X$^2$, respectively, Ar$^2$ is, in case of multiple occurrence independently of one another, an arylene or heteroarylene group that is optionally substituted with one or more groups R and optionally comprises fused rings, a and c are independently of each other 1, 2 or 3, and, in case b is 0, one of a and c may also be 0, b is 0, 1, 2, 3 or 4, X$^1$ and X$^2$ are independently of each other a functional halide group or a functional boron group, R in case of multiple occurrence independently of one another has one of the meanings of X$^1$ or is aryl, heteroaryl, aryloxy or heteroaryloxy, which is optionally substituted by one or more groups L, or straight chain, branched or cyclic alkyl with 1 to 20 C-atoms, which is optionally mono- or polysubstituted by F, Cl, Br or I, and wherein one or more non-adjacent CH$_2$ groups are optionally replaced, in each case independently from one another, by —O—, —S—, —NR$^O$—, —SiR$^O$R$^{OO}$—, —CY$^1$=CY$^2$— or —C≡C— in such a manner that O and/or S atoms are not linked directly to one another, or is selected from F, Cl, CN, NO$_2$, NR$^O$R$^{OO}$, —SiR$^O$R$^{OO}$R$^{OOO}$, —C≡C—SiR$^O$R$^{OO}$R$^{OOO}$ or sulfonyl L is F, Cl, Br, I, CN, NO$_2$, NR$^O$R$^{OO}$, —SiR$^O$R$^{OO}$R$^{OOO}$, —C≡C—SiR$^O$R$^{OO}$R$^{OOO}$, sulfonyl, or straight chain, branched or cyclic alkyl having 1 to 20 C atoms, which is unsubstituted, mono- or poly-substituted by F, Cl, Br, I, —CN or —OH, and in which one or more non-adjacent CH$_2$ groups are optionally replaced, in each case independently from one another, by —O—, —S—, —NH—, —NR$^O$—, —SiR$^O$R$^{OO}$—, —CO—, —COO—, OCO—, —OCO—O, —S—CO—, —CO—S—, —CH=CH— or —C≡C— in such a manner that O and/or S atoms are not linked directly to one another, Y$^1$ and Y$^2$ are independently of each other H, F or Cl, R$^O$, R$^{OO}$ and R$^{OOO}$ are independently of each other H, alkyl with 1 to 12 C-atoms or aryl.

In case of a process where one compound is polymerised, it is preferably selected of formula I wherein X$^1$ is a halide group (AB-type).

In case of a process where a first and a second compound are copolymerised, the first compound is preferably selected of formula I wherein X$^1$ and X$^2$ are a halide group (AA-type), and the second compound is preferably selected of formula I wherein X$^1$ and X$^2$ are a boron group (BB-type).

Examples of thiophene and selenophene groups for Ar$^1$ and Ar$^3$ are thiophene-2,5-diyl, selenophene-2,5-diyl, 2,2'-dithiophene-5,5'-diyl, thieno[2,3-b]thiophene-2,5-diyl, thieno[3,2-b]thiophene-2,5-diyl, and benzo[1,2-b:4,5-b']dithiophene-2,6-diyl, all of which are unsubstituted or substituted by R.

Ar$^1$ and Ar$^3$ in formula I are preferably selected from
a) thiophene-2,5-diyl (A1), selenophene-2,5-diyl (A2) or thieno[2,3-b]thiophene-2,5-diyl (A3),

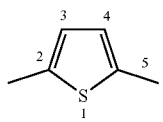

(A1)

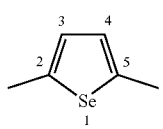

(A2)

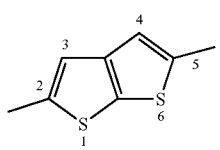

(A3)

which are optionally substituted in 3- and/or 4-position with R, b) thieno[3,2-b]thiophene-2,5-diyl (A4),

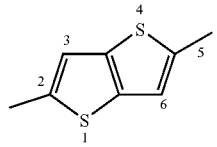

(A4)

which is optionally substituted in 3- and/or 6-position with R, c) benzo[1,2-b:4,5-b']dithiophene-2,6-diyl (A5)

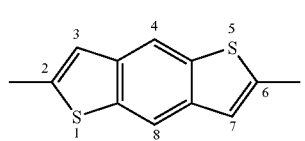

(5)

which is optionally substituted in 3-, 4-7- or 8-position with R.

Ar$^2$ in formula I is preferably a mono-, bi- or tricyclic aromatic or heteroaromatic group with up to 25 C atoms, wherein the rings can be fused, and in which the heteroaromatic group contains at least one hetero atom (preferably 1 to 3) preferably selected from N, O and S. It is optionally substituted with one or more groups L$^1$, with L$^1$ being selected from F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent CH$_2$ groups are optionally replaced, in each case independently from one another, by —O—, —S—, —NH—, —NR$^O$—, —SiR$^O$R$^{OO}$—, —CO—, —COO—, OCO—, —OCO—O, —S—CO—, —CO—S—, —CH=CH— or —C≡C— in such a manner that O and/or S atoms are not linked directly to one another.

In formula I, when a or c is greater than 1, the Ar$^1$ and Ar$^3$ that are not linked to X$^1$ or X$^2$ are each preferably a mono-, bi- or tricyclic aromatic or heteroaromatic group with up to 25 C atoms, wherein the rings can be fused, and in which the heteroaromatic group contains at least one hetero atom (preferably 1 to 3) preferably selected from N, O and S. It is optionally substituted with one or more groups L, with L being selected from F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent CH$_2$ groups are optionally replaced, in each case independently from one another, by —O—, —S—, —NH—, —NR$^O$—, —SiR$^O$R$^{OO}$—, —CO—, —COO—, OCO—, —OCO—O, —S—CO—, —CO—S—, —CH=CH— or —C≡C— in such a manner that O and/or S atoms are not linked directly to one another.

Preferred arylene or heteroarylene groups for Ar$^2$, and for Ar$^1$ and Ar$^3$ rings that are not linked to X$^1$ or X$^2$, are selected from phenylene in which, in addition, one or more CH groups may be replaced by N, or naphthalene, alkyl fluorene, oxazole, thiophene, selenophene, dithienothiophene, wherein all these groups are optionally mono- or polysubstituted with L as defined above.

Further preferred arylene or heteroarylene groups Ar$^2$ are 1,4-phenylene-1,4-diyl, pyridine-2,5-diyl, pyrimidine-2,5- diyl, 1,1'-biphenyl-4,4'-diyl, naphthalene-2,6-diyl, thiophene-2,5-diyl, selenophene-2,5-diyl, fluorene-2,7-diyl, 2,2'-dithiophene-5,5'-diyl, thieno[2,3-b]thiophene-2,5-diyl, thieno[3,2-b]thiophene-2,5-diyl, benzo[1,2-b:4,5-b']dithiophene-2,6-diyl, thiazole-2,5-diyl, thiadiazole-2,5-diyl, thieno[2,3-d]thiazole-4,6-diyl, thieno[2,3-d]thiazole-6,4-diyl, oxazole-2,5-diyl and oxadiazole-2,5-diyl, all of which are unsubstituted, or optionally fluorinated, alkylated, or mono- or polysubstituted with L as defined above.

Especially preferred are the following compounds of formula I b is 0, a+c is 1, 2 or 3 and $Ar^1$ and $Ar^3$ are selected from thiophene-2,5-diyl that is optionally substituted (e.g., by R or L) in 3- and/or 4-position, a+c is 1, 2 or 3 and $Ar^1$ and $Ar^3$ are selected from selenophene-2,5-diyl that is optionally substituted (e.g., by R or L) in 3- and/or 4-position, a+c is 1 and $Ar^1$, or $Ar^3$ respectively, is thieno[2,3-b]thiophene-2,5-diyl that is optionally substituted (e.g., by R or L) in 3- and/or 4-position, a+c is 1 and $Ar^1$, or $Ar^3$ respectively, is thieno[3,2-b]thiophene-2,5-diyl that is optionally substituted (e.g., by R or L) in 3- and/or 6-position, a+c is 1 and $Ar^1$, or $Ar^3$ respectively, is benzo[1,2-b:4,5-b']dithiophene-2,6-diyl that is optionally substituted (e.g., by R or L) in 3- and/or 6-position, if $X^1$ and/or $X^2$ are halogen they are selected from Br and I, R is straight chain, branched or cyclic alkyl, alkenyl, alkynyl, alkoxy, oxaalkyl, alkylcarbonyl, alkoxycarbonyl, alkylcarbonyloxy, thioalkyl, alkylsilyl or dialkylamino with 1 to 20 C-atoms that is optionally substituted with one or more fluorine atoms, or aryl or heteroaryl.

The AA-type compounds are preferably selected of formulae I1a-I1f.

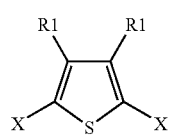

I1a

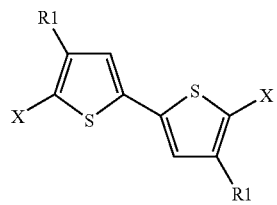

I1b

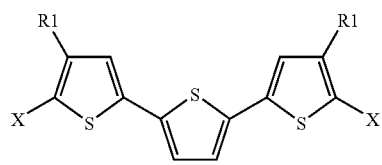

I1c

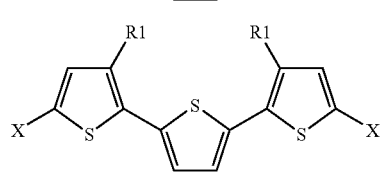

I1d

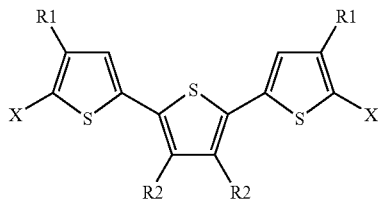

I1e

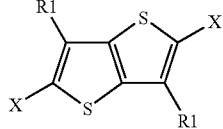

I1f

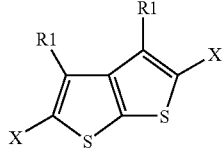

I1g

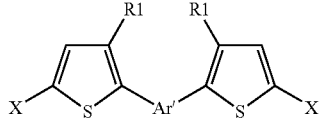

I1h

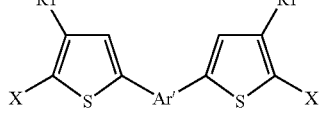

I1i

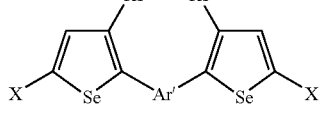

I1k

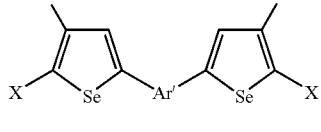

I1m

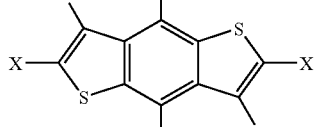

I1n

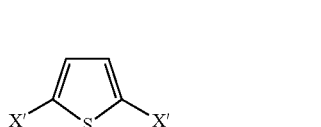

The BB-type compounds are preferably selected of formulae I2a-I2f.

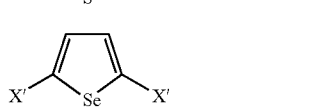

I2a

I2b

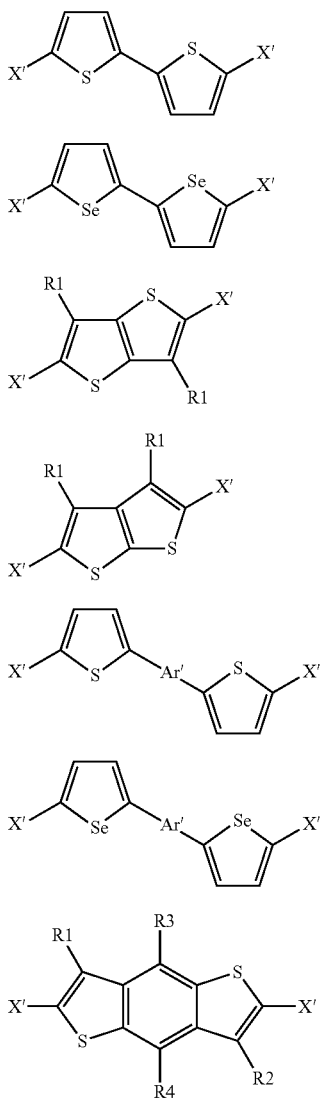

wherein
Ar' has one of the meanings for Ar²,
X is a halide group as defined above and below,
X' is a boron group as defined above and below, and
R¹⁻⁴ have independently of each other one of the meanings of R in formula I.

The AB-type compounds are preferably selected of the following formulae

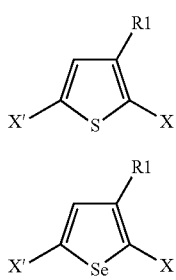

wherein
X is a halide group as defined above and below,
X' is a boron group as defined above and below, and
R¹ and R² have independently of each other one of the meanings of R in formula I.

In the compounds of formula I and the preferred subformulae, R, R¹ and R² are preferably identical or different groups selected from straight chain, branched or cyclic alkyl, alkenyl, alkynyl, oxaalkyl, alkoxy, alkoxycarbonyl, alkylcarbonyloxy, thioalkyl, alkylsilyl or dialkylamino with 1 to 20 C-atoms that is optionally substituted with one or more fluorine atoms, or aryl or heteroaryl.

If any one of R, R⁰, R⁰⁰, R⁰⁰⁰, R¹ or R² is aryl or heteroaryl, or if R is aryloxy or heteroaryloxy, the aryl or heteroaryl group is preferably a mono-, bi- or tricyclic aromatic or heteroaromatic group with up to 25 C atoms, wherein the rings can be fused, and in which the heteroaryl group contains at least one hetero ring atom (preferably 1 to 3), preferably selected from N, O and S, and is optionally substituted with one or more groups L, wherein L is as defined above.

If R, R¹ or R² is an alkyl group it may be straight-chain or branched. It is preferably straight-chain, has 4 to 16 C-atoms carbon atoms and accordingly is preferably methyl, ethyl, propyl, butyl, pentyl, hexyl, heptyl, octyl, nonyl, decyl, undecyl, dodecyl, tridecyl, tetradecyl, pentadecyl, or hexadecyl for example.

If R, R¹ or R² is an alkyl group wherein one or more $CH_2$ groups are replaced by —CH=CH—, this may be straight-chain or branched. It is preferably straight-chain, has 2 to 10 C-atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

R, R¹ or R² can also be a chiral group like for example 2-butyl (=1-methylpropyl), 2-methylbutyl, 2-methylpentyl, 3-methylpentyl, 2-ethylhexyl, 2-propylpentyl, 4-methylhexyl, 2-hexyl, 2-octyl, 2-nonyl, 2-decyl, 2-dodecyl, 1,1,1-trifluoro-2-octyl, 1,1,1-trifluoro-2-hexyl or an achiral branched group like for example isopropyl, isobutyl (=methylpropyl) or isopentyl (=3-methylbutyl).

If R, R¹ or R² is an alkoxy group where the terminal $CH_2$ group (i.e. the one linked to the aromatic ring) is replaced by —O—, this may be straight-chain or branched. It is preferably straight-chain, has 2 to 16 carbon atoms and accordingly is preferably ethoxy, propoxy, butoxy, pentoxy, hexyloxy, heptoxy, or octoxy, furthermore nonoxy, decoxy, undecoxy, dodecoxy, tridecoxy, tetradecoxy, pentadecoxy or hexadecoxy for example.

If R, R¹ or R² is oxaalkyl where one $CH_2$ group is replaced by —O—, is preferably straight-chain 2-oxapropyl (=methoxymethyl), 2-oxabutyl (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In another preferred embodiment R, $R^1$ or $R^2$ is oxaalkyl wherein two or more non-adjacent $CH_2$ groups are replaced by —O—, like for example 1,4-dioxahexyl, 3,6-dioxaoctyl, 5,8-dioxadecyl or 7,10-dioxadodecyl.

If R, $R^1$ or $R^2$ is thioalkyl where one $CH_2$ group is replaced by —S—, is preferably straight-chain thiomethyl (—$SCH_3$), 1-thioethyl (—$SCH_2CH_3$), 1-thiopropyl (—$SCH_2CH_2CH_3$), 1-(thiobutyl), 1-(thiopentyl), 1-(thiohexyl), 1-(thioheptyl), 1-(thiooctyl), 1-(thiononyl), 1-(thiodecyl), 1-(thioundecyl) or 1-(thiododecyl), wherein preferably the $CH_2$ group adjacent to the $sp^2$ hybridised vinyl carbon atom is replaced.

If R, $R^1$ or $R^2$ is fluoroalkyl, it is preferably straight-chain perfluoroalkyl $C_iF_{2i+1}$, wherein i is an integer from 1 to 15, in particular $CF_3$, $C_2F_5$, $C_3F_7$, $C_4F_9$, $C_5F_{11}$, $C_6F_{13}$, $C_7F_{15}$ or $C_8F_{17}$, very preferably $C_6F_{13}$.

—$CY^1$=$CY^2$— is preferably —CH=CH—, —CF=CF— or —CH=C(CN)—.

Preferred aryl and heteroaryl groups are phenyl in which one or more CH groups are optionally replaced by N, biphenyl, naphthalene, thiophene, selenophene, thienothiophene, dithienothiophene, fluorene, benzo[1,2-b:4,5-b']dithiophene, thiazole and oxazole, all of which can be unsubstituted, mono- or polysubstituted with L as defined above.

Especially preferred aryl and heteroaryl groups are selected from phenyl, pyridine, pyrimidine, naphthalene, thiophene, selenophene, thienothiophene, fluorene, thiazole and oxazole, all of which are unsubstituted, mono- or polysubstituted with L as defined above.

L is preferably selected from F, Cl, Br, I, alkyl, alkoxy, alkylcarbonyl, alkoxycarbonyl, alkylcarbonyloxy or thioalkyl with 1 to 20 C atoms, wherein one or more H atoms are optionally substituted by F or Cl.

The process according to this invention is especially suitable as a polymerisation method for thiophene and selenophenes to yield conjugated polymers or copolymers with high molecular weight ($M_n$>20,000 Da) in high yields. It is based upon the palladium-catalysed Suzuki coupling and employs a highly active catalyst/ligand system, using a palladium(0) or palladium(II) catalyst and a trialkylphosphine or a trialkylphosphonium salt, or a mixed trisubstituted phosphine or phosphonium salt that is substituted with alkyl and aryl groups. The high activity of the catalyst/ligand system enables a high molecular weight polymer to be formed before significant deboronation occurs.

As previously mentioned, the problem with current Suzuki methodology is that high molecular weight polythiophenes cannot be obtained due to deboronation. Thiophene boronate esters/acids are particularly sensitive to deboronation. In contrast, by using a catalyst/ligand system with higher activity i.e higher coupling rate as claimed in the present invention, many aryl-aryl couplings can occur before significant deboronation (side-reaction) takes place, allowing high molecular weight polythiophenes to be obtained.

Trialkylphosphines are more reactive ligands than triarylphosphines due to their higher electron richness and sterics [13]. However, they are not air-stable and tend to readily oxidise to phosphine oxide products. Furthermore, some of them, such as tri-tert-butylphosphine, are pyrophoric. However, this invention describes a solution to these handling and stability issues, namely the use of a robust air-stable trialkylphosphonium salt or a mixed alkyl-/aryl-phosphonium salt from which the active phosphine is generated 'in-situ' by addition of a base [13].

The preparation of trialkylphosphonium salts and their use in Suzuki couplings has previously been reported by Fu et al [13]. Some trialkylphosphonium or alkyl-/arylphosphonium salts, such as tri-tert-butylphosphonium tetrafluoroborate, are now commercially available.

By using a phosphine-free palladium(0) catalyst (e.g. $Pd_2(dba)_3$) in conjunction with a trialkylphosphine or trialkylphosphonium salt, or with a mixed alkyl-/arylsubstituted phosphine or phosphonium salt, a large range of polythiophenes is accessible with Suzuki methodology (see Scheme 1).

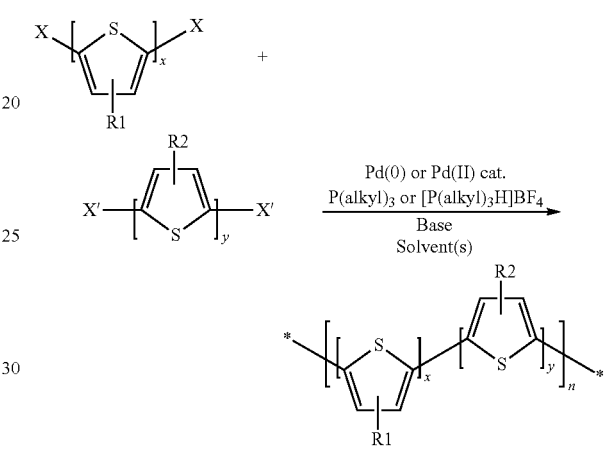

where X=halide; X'=boron group; R1, R2=alkyl or H; x, y=1,2,3,4,5

Furthermore, it is also possible to use phosphine-free palladium(II) catalysts (e.g. $Pd(OAc)_2$) in conjunction with either a trisubstituted phosphine or phosphonium salt, or a palladium(II)-trisubstitutedphosphine complex (e.g. $PdCl_2(PCy_3)_2$). The palladium(II) species are then reduced 'in-situ' to the active palladium(0) species.

Prior art [14] also discloses a process for preparing aryl-aryl compounds using Suzuki coupling with a palladium(0) or palladium(II) catalyst with various ligands, except triphenylphosphine. However, it is not disclosed or suggested that trialkylphosphines or alkyl/arylsubstituted phosphines are especially suitable, or that the corresponding phosphonium salts can be used, or that the process is suitable for the preparation of polythiophenes or polyselenophenes with high molecular weight.

With the process according to the present invention it is possible for example to copolymerise an M-type compound and a BB-type compound having the same core, or to polymerise an AB-type compound. Thereby regioregular homopolymers can be formed.

It is also possible for example to copolymerise one AA-type compound and one BB-type compound having different cores. Thereby alternating copolymers can be formed.

It is also possible for example to copolymerise a mixture of two or more AA-type compounds having different cores and/or two or more BB-type compounds having different cores, or to copolymerise a mixture of two or more AB-type compounds with different cores. Thereby statistical or random copolymers can be formed.

It is also possible to carry out the polymerisation in different steps. For example, it is possible to react an AA-type compound with a BB-type compound having a given core in a first polymerisation step, and to add an AA-type compound and/or a BB-type compound with a different core for a second polymerisation step. Alternatively, it is possible to react a first AB-type compound in a first polymerisation step and to add a second AB-type compound having a different core for a second polymerisation step. Thereby block copolymers can be formed.

It is also possible for example to polymerise multifunctional compounds having more than two functional groups. Thereby crosslinked polymers can be formed. Suitable multifunctional compounds are for example compounds of formula I wherein $Ar^1$, $Ar^2$, or $Ar^3$ is substituted with one or more groups R having the meaning of $X^1$.

It is also possible to add monofunctional compounds (A-type or B-type), also known as "endcappers", to the reaction mixture, in order to control or limit the degree of polymerisation and molecular weight of the polymer, and to react with any remaining functional end-groups in the polymer such as halides or boronates.

The catalyst/ligand system (component a) comprises a palladium catalyst and an organic trisubstituted phosphine or phosphonium salt.

The palladium catalyst is preferably a Pd(0) or Pd(II) compound or metallic Pd. Suitable and preferred Pd compounds are for example Pd(II) salts or organic Pd(0) compounds or complexes. Very preferred are Pd(II) halides, Pd(II) carboxylates and Pd(II)β-diketonates. Examples of preferred catalysts include the following compounds $Pd_2(dba)_3$ [tris(dibenzylideneacetone) dipalladium(0)],
$Pd(dba)_2$ [bis(dibenzylideneacetone) palladium (0)],
$Pd(PR'_3)_2$ [bis(trialkylphosphine) palladium(0), wherein R' is alkyl that is straight-chain, branched or cyclic and has preferably 1 to 12 C atoms, or aryl with 4 to 20 C atoms that is optionally substituted, preferably alkyl, like for example bis(tri-tert-butylphosphine)palladium(0)],
$Pd(OAc)_2$ [palladium(II) acetate],
$PdCl_2(PR'_3)_2$ [dichlorobis(trialkylphosphine) palladium(II), wherein R' is alkyl or aryl as defined above, preferably alkyl, like for example dichlorobis(tricyclohexylphosphine) palladium(II)],
$PdCl_2(PhCN)_2$ [dichlorobis(benzonitrile) palladium(II),
$PdCl_2(CH_3CN)$ [dichlorobis(acetonitrile) palladium(II)], or
$PdCl_2(cod)$ [dichloro(1,5-cyclooctadiene) palladium(II)].

Most preferred are $Pd_2(dba)_3$, $Pd(dba)_2$, $Pd(OAc)_2$ or $Pd(PR'_3)_2$.

The phosphine compound is an organic trisubstituted phosphine ligand that is capable of coordinating to the Pd atom. The phosphine ligand is formed in situ from the corresponding phosphonium salt during the process by the addition of base. Alternatively, the phosphine ligand is directly employed in the process.

Preferred phosphine ligands are selected from the formula $R^a_x R^b_y R^c_z P$, wherein
P denotes phosphorus,
$R^a$, $R^b$ and $R^c$ are identical or different straight-chain, branched or cyclic alkyl groups with 1 to 12 C atoms that are optionally fluorinated, or aryl groups with 4 to 20 C atoms that are optionally substituted (e.g., by R or L),
x, y and z are 0, 1, 2 or 3, with x+y+z=3, Preferably the organic phosphine or phosphonium salt comprises at least one substituent $R^a$, $R^b$, $R^c$ that is an alkyl group as defined above.

Especially preferred are ligands of the formula $R^a_3 P$ wherein all groups $R^a$ are identical. Further preferred are ligands of the formula $R^a_2 R^b P$ or $R^a R^b_2 P$, wherein $R^a$ and $R^b$ are different, all groups $R^a$ are identical, and all groups $R^b$ are identical. Further preferred are ligands wherein $R^a$ and $R^b$ are alkyl as defined above, and ligands wherein $R^a$ is an alkyl group and $R^b$ an aryl group as defined above. Preferred alkyl and aryl groups are those as defined above for R.

Examples of preferred ligands are triethylphosphine, tri-iso-propyl-phosphine, tri-cyclohexylphosphine, tri-tert-butylphosphine (t-Bu), bis(di-tert-butylphosphino)methane and 2-dicyclohexylphosphino-2',6'-dimethoxybiphenyl.

Preferred phosphonium salts are selected from the formula $[R^a_x R^b_y R^c_z PH]^+ Z^-$ wherein $R^{a-c}$ and x, y and z are as defined above and $Z^-$ is a suitable anion, like for example $BF_4^-$, $PF_6^-$ or $SbF_6^-$. Especially preferred are the corresponding phosphonium salts, for example phosphonium tetrafluoroborates, of the above mentioned preferred phosphine ligands.

Most preferred are $t-Bu_3P$ and $[t-Bu_3PH]BF_4$.

The palladium catalyst is present in the reaction mixture in catalytic amounts. The term "catalytic amount" as used above and below refers to an amount that is clearly below one equivalent of the heteroaromatic compound(s), preferably 0.01 to 5 mol. %, most preferably 0.01 to 1 mol. %, based on the equivalents of the heteroaromatic compound(s) used.

The amount of phosphines or phosphonium salts in the reaction mixture is preferably from 0.02 to 10 mol. %, most preferably 0.02 to 2 mol. %, based on the equivalents of the heteroaromatic compound(s) used. The preferred ratio of Pd:phosphine is 1:2.

The base (component b) can be selected from all aqueous and non-aqueous bases. It is preferable that at least 1.5 equivalents of said base per functional boron group is present in the reaction mixture. Suitable and preferred bases are, for example, alkali and alkaline earth metal hydroxides, carboxylates, carbonates, fluorides and phosphates such as sodium and potassium hydroxide, acetate, carbonate, fluoride and phosphate or also metal alcoholates, preferably corresponding phosphates or carbonates. It is also possible to use a mixture of bases. Most preferred is aq. $K_2CO_3$ or aq. $Na_2CO_3$.

The solvent (component c) is for example selected from toluene, xylenes, anisole, THF (tetrahydrofuran), 2-methyltetrahydrofuran, dioxane, chlorobenzene, fluorobenzene or solvent mixtures comprising one or more solvents like e.g. THF/toluene. Most preferred is THF or THF/toluene.

For polymerisations that are performed in a single solvent or a solvent mixture, it is possible to add a secondary or tertiary co-solvent once the polymerisation has initiated and after a given period of time. The purpose of this co-solvent addition is to keep the growing polymer chains in solution during the polymerisation process. This also assist the recovery of the polymer from the reaction mixture at the end of the reaction and therefore improve the isolated yield of the polymer.

The polymer obtained by the process according to the present invention preferably has a degree of polymerisation of at least 20, more preferably at least 50, most preferably at least 100. Preferred weight average molecular weights are at least 10,000 g $mol^{-1}$, more preferably at least 25,000 g $mol^{-1}$, most preferably at least 50,000 g $mol^{-1}$.

After polymerisation the polymer is preferably recovered from the reaction mixture, for example by conventional work-up, and purified. This can be achieved according to standard methods known to the expert and described in the literature.

Optionally the terminal groups of the polymer are chemically modified ('endcapped') during or after polymerisation. Endcapping can be carried out for example by adding monofunctional compounds of formula I, or commercially available monofunctional compounds, for example bromobenzene, phenylboronic acid/boronate, 2-bromothiophene, and thiophene 2-boronic acid/boronate.

Simple commercial monofunctional compounds are typically used, but monofunctional derivatives of formula I can also be used.

Endcapping can be carried out at the end of the reaction by addition of an 'endcapper' (i.e. a monofunctional compound of formula I or a commercial monofunctional compound). Alternatively, endcapping can be carried out 'in situ' by addition of a small quantity of 'endcapper' to the reaction mixture at the beginning of the reaction. The incorporation of an 'in situ' endcapper also controls the molecular weight of the polymer obtained, where the molecular weight obtained is dependent on the molar quantity of endcapper used.

Before recovering the polymer from the polymerisation reaction mixture, it may be preferable to add a co-solvent(s), for example toluene or chlorobenzene, to the reaction mixture in order to solubilise any precipitated polymer. The purpose of this is to aid the recovery of the polymer from the reaction mixture and therefore improve the isolated yield of the polymer.

The compounds and polymers prepared by the process according to the present invention can be used as semiconductors, which have high charge mobility, good processability and oxidative stability.

The compounds and polymers of the present invention are useful as optical, electronic and semiconductor materials, in particular as charge transport materials in field effect transistors (FETs), e.g., as components of integrated circuitry, ID tags or TFT applications. Alternatively, they may be used in organic light emitting diodes (OLEDs) in electroluminescent display applications or as backlight of, e.g., liquid crystal displays, as photovoltaics or sensor materials, for electrophotographic recording, and for other semiconductor applications.

The polymers according to the present invention show especially advantageous solubility properties which allow production processes using solutions of these compounds. Thus films, including layers and coatings, may be generated by low cost production techniques, e.g., spin coating. Suitable solvents or solvent mixtures comprise alkanes and/or aromatics, especially their fluorinated or chlorinated derivatives.

The polymers of the present invention are especially useful as charge transport materials in FETs. Such FETs, where an organic semiconductive material is arranged as a film between a gate-dielectric and a drain and a source electrode, are generally known, e.g., from U.S. Pat. No. 5,892,244, WO 00/79617, U.S. Pat. No. 5,998,804, and from the references cited in the background and prior art chapter and listed below. Due to the advantages, like low cost production using the solubility properties of the compounds according to the invention and thus the processibility of large surfaces, preferred applications of these FETs are such as integrated circuitry, TFT-displays and security applications.

In security applications, field effect transistors and other devices with semiconductive materials, like transistors or diodes, may be used for ID tags or security markings to authenticate and prevent counterfeiting of documents of value like banknotes, credit cards or ID cards, national ID documents, licenses or any product with money value, like stamps, tickets, shares, cheques etc.

Alternatively, the polymers according to the invention may be used in organic light emitting devices or diodes (OLEDs), e.g., in display applications or as backlight of e.g. liquid crystal displays. Common OLEDs are realized using multilayer structures. An emission layer is generally sandwiched between one or more electron-transport and/or hole-transport layers. By applying an electric voltage electrons and holes as charge carriers move towards the emission layer where their recombination leads to the excitation and hence luminescence of the lumophor units contained in the emission layer. The inventive compounds, materials and films may be employed in one or more of the charge transport layers and/or in the emission layer, corresponding to their electrical and/or optical properties. Furthermore their use within the emission layer is especially advantageous, if the polymers according to the invention show electroluminescent properties themselves or comprise electroluminescent groups or compounds. The selection, characterization as well as the processing of suitable monomeric, oligomeric and polymeric compounds or materials for the use in OLEDs is generally known by a person skilled in the art, see, e.g., Meerholz, Synthetic Materials, 111-112, 2000, 31-34, Alcala, J. Appl. Phys., 88, 2000, 7124-7128 and the literature cited therein.

According to another use, the polymers according to the present invention, especially those which show photoluminescent properties, may be employed as materials of light sources, e.g., of display devices such as described in EP 0 889 350 A1 or by C. Weder et al., Science, 279, 1998, 835-837.

A further aspect of the invention relates to both the oxidised and reduced form of the polymers according to this invention. Either loss or gain of electrons results in formation of a highly delocalised ionic form, which is of high conductivity. This can occur on exposure to common dopants. Suitable dopants and methods of doping are known to those skilled in the art, e.g., from EP 0 528 662, U.S. Pat. No. 5,198,153 or WO 96/21659.

The doping process typically implies treatment of the semiconductor material with an oxidating or reducing agent in a redox reaction to form delocalised ionic centres in the material, with the corresponding counterions derived from the applied dopants. Suitable doping methods comprise for example exposure to a doping vapor in the atmospheric pressure or at a reduced pressure, electrochemical doping in a solution containing a dopant, bringing a dopant into contact with the semiconductor material to be thermally diffused, and ion-implantantion of the dopant into the semiconductor material.

When electrons are used as carriers, suitable dopants are for example halogens (e.g., $I_2$, $Cl_2$, $Br_2$, ICl, $ICl_3$, IBr and IF), Lewis acids (e.g., $PF_5$, $AsF_5$, $SbF_5$, $BF_3$, $BCl_3$, $SbCl_5$, $BBr_3$ and $SO_3$), protonic acids, organic acids, or amino acids (e.g., HF, HCl, $HNO_3$, $H_2SO_4$, $HClO_4$, $FSO_3H$ and $ClSO_3H$), transition metal compounds (e.g., $FeCl_3$, FeOCl, $Fe(ClO_4)_3$, $Fe(4-CH_3C_6H_4SO_3)_3$, $TiCl_4$, $ZrCl_4$, $HfCl_4$, $NbF_5$, $NbCl_5$, $TaCl_5$, $MoF_5$, $MoCl_5$, $WF_5$, $WCl_6$, $UF_6$ and $LnCl_3$ (wherein Ln is a lanthanoid), anions (e.g., $Cl^-$, $Br^-$, $I^-$, $I_3^-$, $HSO_4^-$, $SO_4^{2-}$, $NO_3^-$, $ClO_4^-$, $BF_4^-$, $PF_6^-$, $AsF_6^-$, $SbF_6^-$, $FeCl_4^-$, $Fe(CN)_6^{3-}$, and anions of various sulfonic acids, such as aryl-$SO_3^-$). When holes are used as carriers, examples of dopants are cations (e.g., $H^+$, $Li^+$, $Na^+$, $K^+$, $Rb^+$ and $Cs^+$), alkali metals (e.g., Li, Na, K, Rb, and Cs), alkaline-earth metals (e.g., Ca, Sr, and Ba), $O_2$, $XeOF_4$, ($NO_2^+$) ($SbF_6^-$), ($NO_2^+$) ($SbCl_6^-$), ($NO_2^+$) ($BF_4^-$), $AgClO_4$, $H_2IrCl_6$, La$(NO_3)_3 \cdot 6H_2O$, $FSO_2OOSO_2F$, Eu, acetylcholine, $R_4N^+$, (R is an alkyl group), $R_4P^+$ (R is an alkyl group), $R_6As^+$ (R is an alkyl group), and $R_3S^+$ (R is an alkyl group).

The conducting form of the polymers of the present invention can be used as an organic "metal" in applications, for example, but not limited to, charge injection layers and ITO planarising layers in organic light emitting diode applications, films for flat panel displays and touch screens, antistatic films, printed conductive substrates, patterns or tracts in electronic applications such as printed circuit boards and condensers.

According to another use the polymers according to the present invention, especially their water-soluble derivatives (for example with polar or ionic side groups) or ionically doped forms, can be employed as chemical sensors or materials for detecting and discriminating DNA sequences. Such uses are described for example in L. Chen, D. W. McBranch, H. Wang, R. Helgeson, F. Wudl and D. G. Whitten, Proc. Natl. Acad. Sci. U.S.A. 1999, 96, 12287; D. Wang, X. Gong, P. S. Heeger, F. Rininsland, G. C. Bazan and A. J. Heeger, Proc. Natl. Acad. Sci. U.S.A. 2002, 99, 49; N. DiCesare, M. R. Pinot, K. S. Schanze and J. R. Lakowicz, Langmuir 2002, 18, 7785; D. T. McQuade, A. E. Pullen, T. M. Swager, Chem. Rev. 2000, 100, 2537.

The compounds and materials according to the present invention can also be used in cosmetic or pharmaceutical compositions, for example in cosmetic compositions for hair treatment as disclosed in EP 1 498 112A2.

The entire disclosures of all applications, patents and publications, cited above and below, and of corresponding European Application Nos. 05017718.7, filed Aug. 16, 2005, and 06002595.4, filed Feb. 9, 2006, are hereby incorporated by reference.

REFERENCES

1. R. S. Loewe, P. C. Ewbank, J. Liu, L. Zhai, R. D. McCullough, *Macromolecules,* 2001, 34, 4324.
2. T.-A. Chen, R. D. Rieke, *J. Am. Chem. Soc.,* 1992, 114, 10087.
3. A. Iraqi, G. W. Barker, *J. Mater. Chem.,* 1998, 8, 25.
4. S. Guillerez, G. Bidan, *Synth. Met.,* 1998, 93,123.
5. T. Yamamoto, A. Morita, Y. Miyazaki, T. Maruyama, H. Wakayama, Z. Zhou, Y. Nakamura, T. Kanbara, S. Sasaki, K. Kubota, K. *Macromolecules,* 1992, 25,1214.
6. M. C. Gallazzi, C. Bertarelli, E. Montoneri, *Synth. Met.,* 2002, 128, 91.
7. M. Jayakannan, J. L. J. van Dongen, R. A. J. Janssen, *Macromolecules,* 2001, 34, 5386.
8. J. R. Kline, M. D. McGehee, E. N. Kadnikova, J. Liu, J. M. J. Frechet, M. F. Toney, *Macromolecules,* 2005, 38, 3312
9. P. Schillinsky, U. Asawapirom, U. Scherf, M. Biele, C. J. Brabec, *Chem. Mater.,* 2005, 17, 2175.
10. WO 99/20675 A1.
11. WO 00/53656 A1.
12. WO 03/035713 A1.
13. M. R. Netherton, G. C. Fu, *Org. Lett.,* 2001, 3, 4295.
14. WO 03/048225 A2.

The examples below serve to illustrate the invention without limiting it. In the foregoing and the following, all temperatures are given in degrees Celsius, and all percentages are by weight, unless stated otherwise.

Preparation of Functional Compounds

Preparation of 2,5-bis(4,4,5,5-tetramethyl-1,3,2-dioxaborolan-2-yl)thieno[2,3-b]thiophene Thieno[2,3-b]thiophene (2.20 g, 15.69 mmol) is charged to a 3-necked RBF under nitrogen. Anhydrous THF (20 mL) is added. The stirred solution is cooled to −78° C. A 2.5M n-BuLi solution in hexanes (14 mL, 35.00 mmol) is added. The reaction mixture is warmed up to RT stirring for 18 h. The reaction mixture is cooled to −78° C. and 2-isopropoxy-4,4,5,5-tetramethyl-1,3,2-dioxaborolane (6.42 g, 34.52 mmol) is added. The reaction mixture is warmed up to RT stirring for 8 h. The reaction mixture is poured into saturated aq. $NH_4Cl$ solution (100 mL) and extracted into EtOAc (2×100 mL). The combined extracts is washed with water (100 mL) and brine (100 mL), dried over sodium sulfate, and concentrated in vacuo. The crude product is dissolved in DCM and filtered through a plug of silica and the filtrate is concentrated in vacuo. Recrystallisation from acetonitrile yielded the product as white plates (2.80 g, 45%): $^1$H NMR (300 MHz, $CDCl_3$) δ 7.73 (s, 2H), 1.36 (s, 24H). $^{13}$C NMR (75 MHz, $CDCl_3$) 150.5, 150.3, 129.6, 84.2, 24.7.

Preparation of 2,5-bis(4,4,5,5-tetramethyl-1,3,2-dioxaborolan-2-yl)thieno[3,2-b]thiophene Thieno[3,2-b]thiophene (2.20 g, 15.69 mmol) is charged to a 3-necked RBF under nitrogen. Anhydrous THF (20 mL) is added. The stirred solution is cooled to −50° C. A 2.5M n-BuLi solution in hexanes (14 mL, 35.00 mmol) is added. The reaction mixture is stirred at −50° C. for 1 h. The reaction mixture is warmed up to RT stirring for 1 h. The reaction mixture is cooled to −50° C. and 2-isopropoxy-4,4,5,5-tetramethyl-1,3,2-dioxaborolane (6.42 g, 34.52 mmol) is added. The reaction mixture is warmed up to RT stirring for 18 h. The reaction mixture is poured into saturated aq. $NH_4Cl$ solution (100 mL) and extracted into DCM (2×100 mL). The combined extracts are washed with water (100 mL), dried over sodium sulfate, and concentrated in vacuo. The crude product is dissolved in DCM and filtered through a plug of silica and the filtrate is concentrated in vacuo. Recrystallisation from acetone yielded the product as white needles (1.55 g, 25%): $^1$H NMR (300 MHz, $CDCl_3$) δ 7.76 (s, 2H), 1.36 (s, 24H). $^{13}$C NMR (75 MHz, $CDCl_3$) δ 146.6, 128.9, 84.4, 24.8.

Preparation of 2-bromo-5-(4,4,5,5-tetramethyl-1,3,2-dioxaborolan-2-yl)-3-hexylthiophene 2,5-Dibromo-3-hexylthiophene (2.00 g, 6.13 mmol) is charged to a 3-necked RBF under nitrogen. Anhydrous THF (50 mL) is added. The stirred solution is cooled to −78° C. A 2.5M n-BuLi solution in hexanes (2.5 mL, 6.25 mmol) is added. The reaction mixture is stirred at −78° C. for 0.5 h. 2-Isopropoxy-4,4,5,5-tetramethyl-1,3,2-dioxaborolane (1.20 g, 6.45 mmol) is added. The reaction mixture is warmed up to RT stirring for 18 h. The reaction mixture is poured into saturated aq. $NH_4Cl$ solution (100 mL) and extracted into EtOAc (3×50 mL). The combined extracts are washed with water (100 mL) and brine (100 mL), dried over sodium sulfate, and concentrated in vacuo. Column chromatography (eluent: petroleum ether 40-60:EtOAc, 10:1 to 4:1) yielded the product as a pale yellow oil (1.22, 53%): $^1$H NMR (300 MHz, $CDCl_3$) δ 7.30 (s, 1H), 2.55 (t, 2H, $^3J=8$ Hz), 1.59 (m, 2H), 1.31 (m, 18H), 0.88 (t, 3H, $^3J=7$ Hz). $^{13}$C NMR (75 MHz, $CDCl_3$) δ 143.4, 138.0, 116.4, 84.1, 31.6, 29.6, 29.3, 28.9, 24.7, 22.5, 13.9.

Preparation of Polymers

Example 1

The following polymer, poly(2,5-bis(3-decylthiophen-2-yl)thieno[2,3-b]thiophene), is prepared:

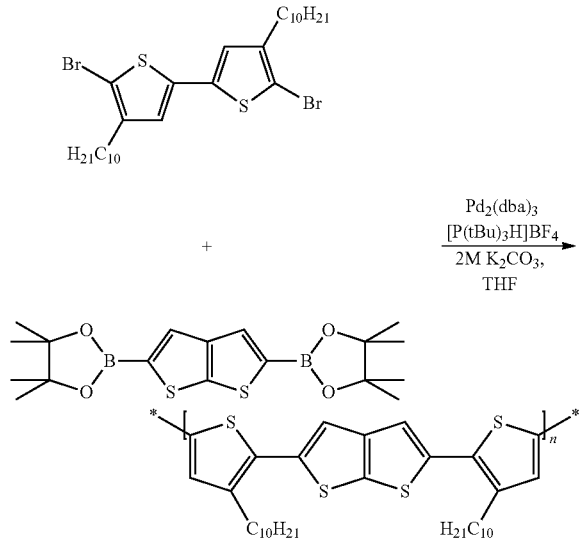

A 3-necked RBF is charged with 5,5'-dibromo-4,4'didecylthiophene (1.200 g, 1.985 mmol), 2,5-bis(4,4,5,5-tetramethyl-1,3,2-dioxaborolan-2-yl)thieno[2,3-b]thiophene (0.778 g, 1.985 mmol), tris(dibenzylidene)dipalladium(0) (36 mg, 0.040 mmol, 2 mol %), tri-tert-butylphosphonium tetrafluoroborate (46 mg, 0.160 mmol, 8 mol %) and THF (30 mL) under a nitrogen atmosphere. A 2M $K_2CO_3$ solution (3 mL, 6.0 mmol) is added to the reaction mixture. The reaction mixture is heated to reflux and stirred for 48 h.

Chlorobenzene is added and the reaction mixture precipitated from methanol. The polymer is filtered off, washed with methanol, and dried under vacuum. The polymer is washed via Soxhlet extraction with acetone, petrol 40-60 and methanol before drying under vacuum. The polymer is dissolved in hot chlorobenzene and re-precipitated from methanol. The polymer is filtered off, washed with methanol, and dried under vacuum to yield the product as an orange solid (0.61 g, 53%): $M_n$=41,400 g mol$^{-1}$; $M_w$=216,000 g mol$^{-1}$ (PhCl at 60° C.).

Example 2

The following polymer, poly(2,5-bis(3-dodecylthiophen-2-yl)thieno[2,3-b]thiophene), is prepared:

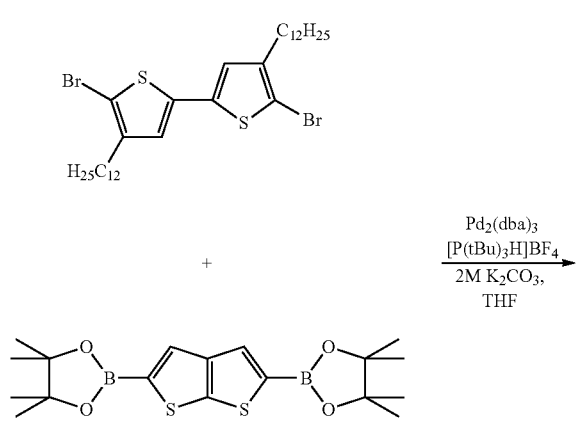

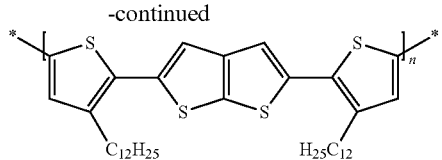

A 3-necked RBF is charged with 5,5'-dibromo-4,4'didodecylthiophene (0.661 g, 1.000 mmol), 2,5-bis(4,4,5,5-tetramethyl-1,3,2-dioxaborolan-2-yl)thieno[2,3-b]thiophene (0.392 g, 1.000 mmol), tris(dibenzylidene)dipalladium(0) (18 mg, 0.020 mmol, 2 mol %), tri-tert-butylphosphonium tetrafluoroborate (23 mg, 0.080 mmol, 8 mol %) and THF (25 mL) under a nitrogen atmosphere. A 2M $K_2CO_3$ solution (1.5 mL, 3.0 mmol) is added to the reaction mixture. The reaction mixture is heated to reflux and stirred for 24 h. Chlorobenzene is added and the reaction mixture precipitated from methanol. The polymer is filtered off, washed with methanol, and dried under vacuum. The polymer is washed via Soxhlet extraction with acetone, petrol 40-60 and methanol before drying under vacuum. The polymer is dissolved in hot chlorobenzene and re-precipitated from methanol. The polymer is filtered off, washed with methanol, and dried under vacuum to yield the product as an orange solid (0.49 g, 76%): $M_n$=28,400 g mol$^{-1}$; $M_w$=120,900 g mol$^{-1}$ (PhCl at 60° C.).

Example 3

The following polymer, poly(2,5-bis(3-decylthiophen-2-yl)thieno[2,3-b]thiophene), is prepared:

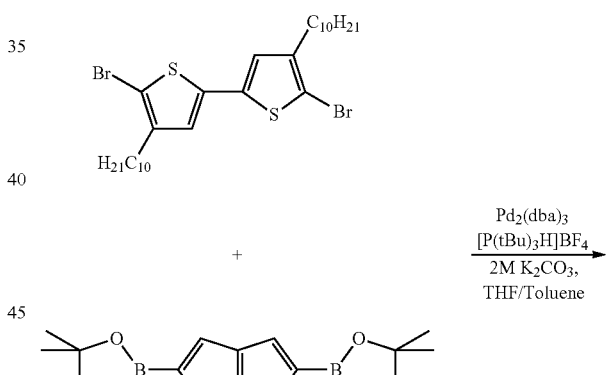

A 3-necked RBF is charged with 5,5'-dibromo-4,4'didecylthiophene (0.605 g, 1.000 mmol), 2,5-bis(4,4,5,5-tetramethyl-1,3,2-dioxaborolan-2-yl)thieno[2,3-b]thiophene (0.391 g, 1.000 mmol), tris(dibenzylidene)dipalladium(0) (18 mg, 0.020 mmol, 2 mol %), tri-tert-butylphosphonium tetrafluoroborate (23 mg, 0.080 mmol, 8 mol %) and THF (15 mL) under a nitrogen atmosphere. A 2M $K_2CO_3$ solution (1.5 mL, 3.0 mmol) is added to the reaction mixture. The reaction mixture is heated to reflux. After 30 minutes, toluene (15 mL) is added and the reaction mixture is stirred for a further 24 h. The reaction mixture precipitated from methanol. The polymer is filtered off, washed with methanol, and dried under vacuum. The polymer is washed via Soxhlet extraction with acetone and then dried under vacuum. The polymer is dissolved in hot chlorobenzene and re-precipitated from methanol. The polymer is filtered off, washed with methanol, and dried under vacuum to yield the product as an orange solid (0.54 g, 93%): $M_n$=30,200 g mol$^{-1}$; $M_w$=63,000 g mol$^{-1}$ (PhCl at 60° C.).

Example 4

The following polymer, poly(2,5-bis(3-decylthiophen-2-yl)thiophene), is prepared:

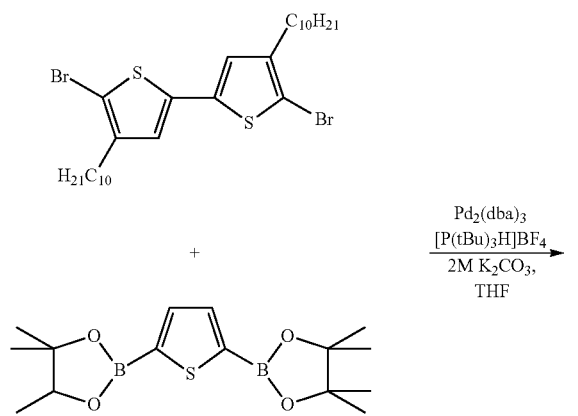

A 3-necked RBF is charged with 5,5'-dibromo-4,4'-didecylthiophene (0.273 g, 0.452 mmol), 2,5-bis(4,4,5,5-tetramethyl-1,3,2-dioxaborolan-2-yl)thiophene (0.152 g, 0.452 mmol), tris(dibenzylidene)dipalladium(0) (8 mg, 0.009 mmol, 2 mol %), tri-tert-butylphosphonium tetrafluoroborate (10 mg, 0.036 mmol, 8 mol %) and THF (15 mL) under a nitrogen atmosphere. A 2M $K_2CO_3$ solution (0.7 mL, 1.4 mmol) is added to the reaction mixture. The reaction mixture is heated to reflux and stirred for 24 h. Chlorobenzene is added and the reaction mixture is precipitated from methanol. The polymer is filtered off, washed with methanol, and dried under vacuum. The polymer is washed via Soxhlet extraction with acetone, petrol 40-60 and methanol before drying under vacuum. The polymer is dissolved in hot chlorobenzene and re-precipitated from methanol. The polymer is filtered off, washed with methanol, and dried under vacuum to yield the product as a purple solid (0.12 g, 52%): $M_n$=36,500 g mol$^{-1}$; $M_w$=271,000 g mol$^{-1}$ (PhCl at 60° C.).

Example 5

The following polymer, poly(2,5-bis(3-dodecylthiophen-2-yl)thieno[3,2-b]thiophene), is prepared:

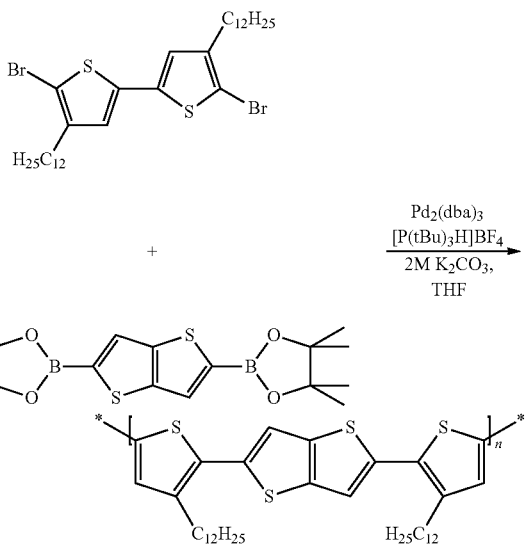

A 3-necked RBF is charged with 5,5'-dibromo-4,4'-didodecylthiophene (0.661 g, 1.000 mmol), 2,5-bis(4,4,5,5-tetramethyl-1,3,2-dioxaborolan-2-yl)thieno[3,2-b]thiophene (0.392 g, 1.000 mmol), tris(dibenzylidene)dipalladium(0) (18 mg, 0.020 mmol, 2 mol %), tri-tert-butylphosphonium tetrafluoroborate (23 mg, 0.080 mmol, 8 mol %) and THF (15 mL) under a nitrogen atmosphere. A 2M $K_2CO_3$ solution (1.5 mL, 3.0 mmol) is added to the reaction mixture. The reaction mixture is heated to reflux and stirred for 24 h. Chlorobenzene is added and the reaction mixture precipitated from methanol. The polymer is filtered off, washed with methanol, and dried under vacuum. The polymer is washed via Soxhlet extraction with acetone ad then dried under vacuum. The polymer is dissolved in hot chlorobenzene and re-precipitated from methanol. The polymer is filtered off, washed with methanol, and dried under vacuum to yield the product as a purple solid (0.52 g, 81%): $M_n$=29,400 g mol$^{-1}$; $M_w$=48,100 g mol$^{-1}$ (PhCl at 60° C.).

Example 6

The following polymer, poly(3-hexylthiophene), is prepared:

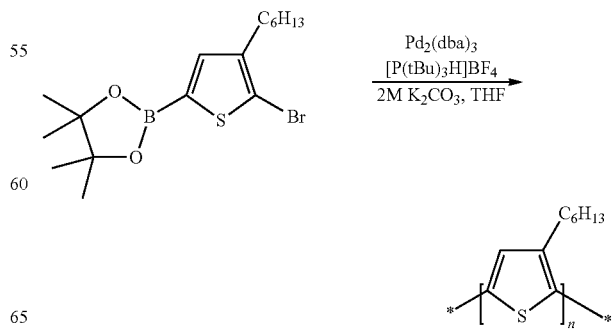

A 3-necked RBF is charged with 2-bromo-5-(4,4,5,5-tetramethyl-1,3,2-dioxaborolan-2-yl)-3-hexylthiophene (1.040 g, 2.731 mmol), tris(dibenzylidene)dipalladium(0) (26 mg, 0.028 mmol, 1 mol %), tri-tert-butylphosphonium tetrafluoroborate (32 mg, 0.110 mmol, 4 mol %) and THF (20 mL) under a nitrogen atmosphere. A 2M $K_2CO_3$ solution (5.6 mL, 11.2 mmol) is added to the reaction mixture. The reaction mixture is heated to reflux and stirred for 18 h. The reaction mixture is precipitated from methanol. The polymer is filtered off, washed with methanol, and dried under vacuum. The polymer is washed via Soxhlet extraction with iso-hexane and then dried under vacuum. The polymer is dissolved in hot chloroform and re-precipitated from methanol. The polymer is filtered off, washed with methanol, and dried under vacuum to yield the product as a purple solid (0.30 g, 64%) with 94% head-to-tail (HT) regioregularity according to $^1$H-NMR. The regioregularity is determined by intergration of the methylene protons around 2.8 ppm (see T. A. Chen, X. Wu, R. D. Rieke J. Am. Chem. Soc., 1995,117, p 233): $^1$H-NMR (300 MHz, $CDCl_3$) δ 6.98 (s, 1H), 2.80 (t, 2H, $^3$J=7.5 Hz), 1.71 (m, 2H), 1.36 (m, 6H), 0.91 (t, 3H, $^3$J=7 Hz); $M_n$=25,000 g $mol^{-1}$; $M_w$=56,000 g $mol^{-1}$ (PhCl at 60° C.).

Example 7

The following polymer, poly(2,5-bis(3-decylthiophen-2-yl)thieno[2,3-b]thiophene), is prepared:

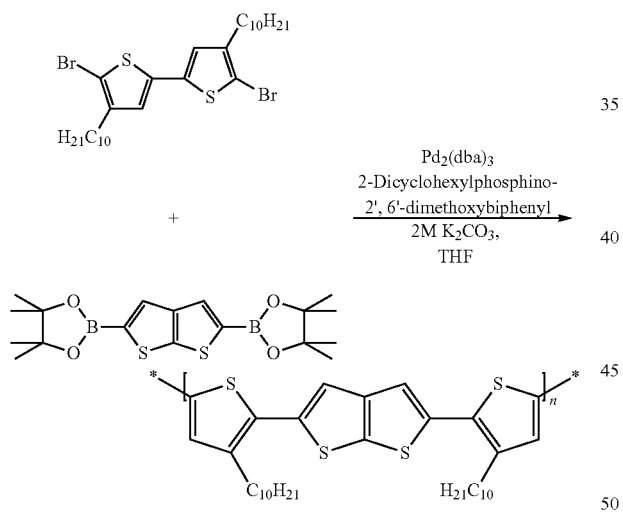

A 3-necked RBF is charged with 5,5'-dibromo-4,4'-didecylthiophene (0.605 g, 1.000 mmol), 2,5-bis(4,4,5,5-tetramethyl-1,3,2-dioxaborolan-2-yl)thieno[2,3-b]thiophene (0.392 g, 1.000 mmol), tris(dibenzylidene)dipalladium(0) (18 mg, 0.020 mmol, 2 mol %), 2-dicyclohexylphosphino-2',6'-dimethoxybiphenyl (33 mg, 0.080 mmol, 8 mol %) and THF (15 mL) under a nitrogen atmosphere. A 2M $K_2CO_3$ solution (1.5 mL, 3.0 mmol) is added to the reaction mixture. The reaction mixture is heated to reflux and stirred for 24 h. The reaction mixture is precipitated from methanol. The polymer is filtered off, washed with methanol, water, and then methanol again, and dried under vacuum to yield the product as an orange solid (0.55 g, 94%): $M_n$=11,100 g $mol^{-1}$; $M_w$=30,300 g $mol^{-1}$ (PhCl at 60° C.).

Example 8

The following polymer, poly(3-hexylthiophene), is prepared:

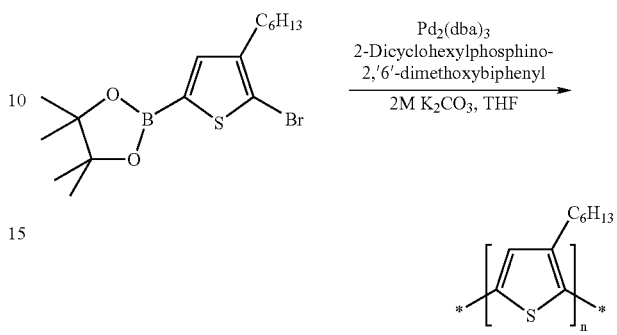

Into a flame-dried Schlenk flask is placed anhydrous $K_3PO_4$ (3.4 g, 16.1 mmol), Pd(OAc)$_2$ (0.024 g, 0.107 mmol), 2-bromo-5-(4,4,5,5-tetramethyl-1,3,2-dioxaborolan-2-yl)-3-hexylthiophene (2.00 g, 5.36 mmol) and 2-dicyclohexylphosphino-2',6'-dimethoxybiphenyl (0.044 g, 0.107 mmol) under Ar. Anhydrous THF (50 mL) is added and the reaction is stirred at room temperature for 16 h. It is then brought to reflux for a further 3 hours, allowed to cool to room temperature, and poured into MeOH (200 mL). The precipitate formed is filtered through a Soxhlet thimble, and worked up as described above. The precipitate is Soxhlet-extracted with, successively, MeOH, acetone, hexane, $CH_2Cl_2$ and THF. The hexane, $CH_2Cl_2$ and THF fractions are separately evaporated to small volume and precipitated into MeOH, filtered and dried in vacuo. Yield: $CH_2Cl_2$: 0.174 g, (19.5%); THF: 0.173 g, (19.4%). $CH_2Cl_2$ fraction: 93.6% HT regioregularity, GPC (in THF at 40° C.) $M_W$=11400, $M_n$=10000, PD=1.14. THF fraction: 97% HT regioregularity. GPC (in THF at 40° C.) $M_W$=16900, $M_n$=15200, PD=1.105.

Example 9

The following polymer, poly(3,6-didodecylthieno[3,2-b]thiophene-alt-2,5-thiophene), is prepared:

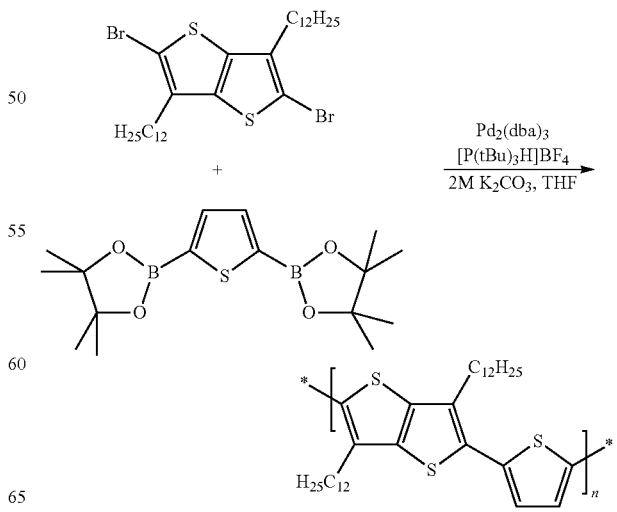

A 3-necked RBF is charged with 2,5-dibromo-3,6-didodecylthieno[3,2-b]thiophene (0.166 g, 0.261 mmol), 2,5-bis(4,4,5,5-tetramethyl-1,3,2-dioxaborolan-2-yl)thiophene (0.088 g, 0.261 mmol), tris(dibenzylidene)dipalladium(0) (5 mg, 0.005 mmol, 2 mol %), tri-tert-butylphosphonium tetrafluoroborate (6 mg, 0.021 mmol, 8 mol %) and THF (10 mL) under a nitrogen atmosphere. A 2M $K_2CO_3$ solution (0.8 mL, 1.6 mmol) is added to the reaction mixture. The reaction mixture is heated to reflux and stirred for 24 h. Chlorobenzene is added and the reaction mixture precipitated from methanol. The polymer is filtered off, washed with methanol, and dried under vacuum. The polymer is washed via Soxhlet extraction with acetone and then dried under vacuum. The polymer is dissolved in hot chlorobenzene and re-precipitated from methanol. The polymer is filtered off, washed with methanol, and dried under vacuum to yield the product as a dark red solid (0.10 g, 68%): $M_n$=6,800 g $mol^{-1}$; $M_w$=15,600 g $mol^{-1}$ (PhCl at 60° C.).

Example 10

The following polymer, poly(3,6-dihexadecylthieno[3,2-b]thiophene-alt-5,5'-bithiophene), is prepared:

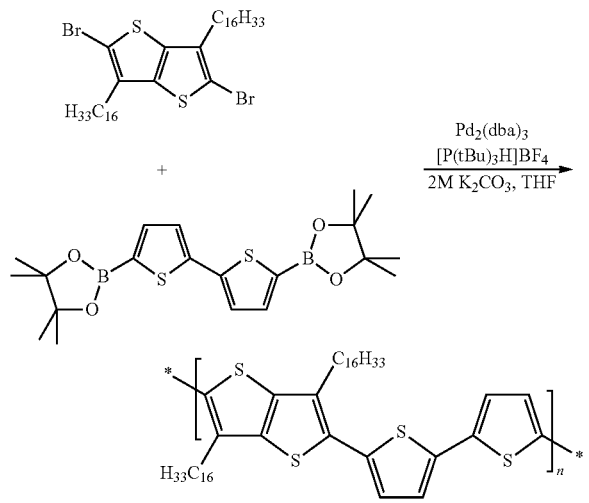

A 3-necked RBF is charged with 2,5-dibromo-3,6-dihexadecylthieno[3,2-b]thiophene (0.373 g, 0.500 mmol), 5,5'-bis(4,4,5,5-tetramethyl-1,3,2-dioxaborolan-2-yl)bithiophene (0.209 g, 0.500 mmol), tris(dibenzylidene)dipalladium(0) (9 mg, 0.010 mmol, 2 mol %), tri-tert-butylphosphonium tetrafluoroborate (12 mg, 0.040 mmol, 8 mol %) and THF (20 mL) under a nitrogen atmosphere. A 2M $K_2CO_3$ solution (0.75 mL, 1.5 mmol) is added to the reaction mixture. The reaction mixture is heated to reflux and stirred for 24 h. Chlorobenzene is added and the reaction mixture precipitated from methanol. The polymer is filtered off, washed with methanol, and dried under vacuum. The polymer is washed via Soxhlet extraction with acetone and then dried under vacuum. The polymer is dissolved in hot chlorobenzene and re-precipitated from methanol. The polymer is filtered off, washed with methanol, and dried under vacuum to yield the product as a dark red solid (0.275 g, 73%): $M_n$=8,000 g $mol^{-1}$; $M_w$=17,500 g $mol^{-1}$ (PhCl at 60° C.).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European Application No. 05017718.7, filed Aug. 16, 2005 and European Application No. 06002595.4, filed Feb. 9, 2006, are incorporated by reference herein.

The invention claimed is:

1. A process for (a) polymerizing a heteroaromatic compound under formation of aryl-aryl C—C couplings, wherein said heteroaromatic compound has at least one functional halide or sulfonyloxy group and at least one functional boron group, or (b) copolymerizing at least one first and at least one second heteroaromatic compound under formation of aryl-aryl C—C couplings, wherein said first compound has at least two functional halide or sulfonyloxy groups and said second compound has at least two functional boron groups, said process comprising:
    performing the polymerization or copolymerization in the presence of
        a) a catalyst/ligand system obtained from a palladium catalyst and an organic phosphonium compound,
        b) a base,
        c) an organic solvent or a mixture of organic solvents,
    wherein
    a reaction mixture is formed by combining said heteroaromatic compound or at least one first and at least one second heteroaromatic compound, said palladium catalyst, said organic phosphonium compound, said base, and said solvent or mixture of solvents, in which said palladium catalyst and organic phosphonium compound are added as separate entities, and said catalyst/ligand system is formed in situ,
    said functional halide or sulfonyloxy groups and said boron groups are attached to a thiophene or selenophene ring that is optionally substituted and optionally fused to another ring, and
    the organic phosphonium compound is a trisubstituted phosphonium salt with substituents selected from alkyl groups that are optionally substituted.

2. A process according to claim 1, wherein said halide or sulfonyloxy groups are each halogen or —$OSO_2R^x$ wherein $R^x$ is optionally fluorinated alkyl or aryl having 1 to 12 C atoms.

3. A process according to claim 2, wherein said halide or sulfonyloxy groups are each Br, I, mesylate, triflate or tosylate.

4. A process according to claim 1, wherein said boron groups are a boronic acid, boronic acid ester or borane group.

5. A process according to claim 4, wherein said boron groups are of the formula —B(OR')(OR") or BR'R", wherein R' and R" are independently of each other H or alkyl having 1 to 12 C-atoms, or R' and R" together form an alkylene or arylene group having 2 to 20 C atoms.

6. A process according to claim 5, wherein said boron groups are selected from the following formulae:

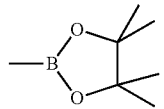

1

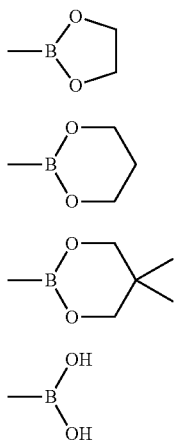

7. A process according to claim 1, wherein said heteroaromatic compounds are each of formula I $$X^1-(Ar^1)_a-(Ar^2)_b-(Ar^3)_c-X^2 \qquad I$$

wherein
- $Ar^1$ and $Ar^3$ are, in case of multiple occurrences independently of one another, identical or different arylene or heteroarylene groups, which are optionally substituted with one or more groups R, optionally comprise fused rings, and comprise a thiophene ring or a selenophene ring linked to $X^1$ and/or $X^2$, respectively,
- $Ar^2$ is, in case of multiple occurrences independently of one another, an arylene or heteroarylene group that is optionally substituted with one or more groups R and optionally comprises fused rings,
- a and c are independently of each other 1, 2 or 3, and, in case b is 0, one of a and c may also be 0,
- b is 0, 1, 2, 3 or 4,
- $X^1$ and $X^2$ are independently of each other a functional halide group or a functional boron group;
- R is, in case independently, a functional halide group, a functional boron group, or
  - is aryl, heteroaryl, aryloxy or heteroaryloxy, which is optionally substituted by one or more groups L, or
  - is straight chain, branched or cyclic alkyl with 1 to 20 C-atoms, which is optionally mono- or polysubstituted by F, Cl, Br or I, and wherein one or more non-adjacent $CH_2$ groups are optionally replaced, in each case independently from one another, by —O—, —S—, —$NR^0$—, —$SiR^0R^{00}$—, —$CY^1=CY^2$— or —C≡C— in such a manner that O and/or S atoms are not linked directly to one another, or
  - is selected from F, Cl, CN, $NO_2$, $NR^0R^{00}$, $SiR^0R^{00}R^{000}$, —C≡C—$SiR^0R^{00}R^{000}$ or sulfonyl, or
  - is H;
- L is F, Cl, Br, I, CN, $NO_2$, $NR^0R^{00}$, $SiR^0R^{00}R^{000}$, —C≡C—$SiR^0R^{00}R^{000}$, sulfonyl, or straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O, —S—CO—, —CO—S—, —CH=CH— or —C≡C— in such a manner that O and/or S atoms are not linked directly to one another;
- $Y^1$ and $Y^2$ are independently of each other H, F or Cl; and
- $R^0$, $R^{00}$ and $R^{000}$ are independently of each other H, alkyl with 1 to 12 C-atoms or aryl.

8. A process according to claim 7, wherein $Ar^1$ and $Ar^3$ are selected from thiophene-2,5-diyl, selenophene-2,5-diyl or thieno[2,3-b]thiophene-2,5-diyl which are optionally substituted in 3- and/or 4-position by R, thieno[3,2-b]thiophene-2,5-diyl which is optionally substituted in 3- and/or 6-position by R, or benzo[1,2-b:4,5-b']dithiophene-2,6-diyl which is optionally substituted in 3-, 4-7- or 8-position with R.

9. A process according to claim 1, wherein said heteroaromatic compounds are each selected from the following formulae:

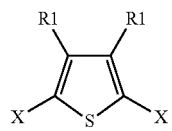   IIa

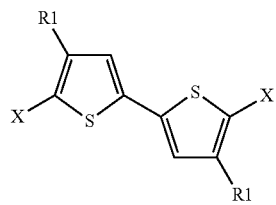   IIb

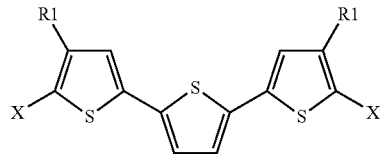   IIc

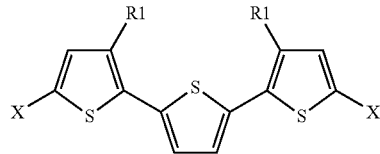   IId

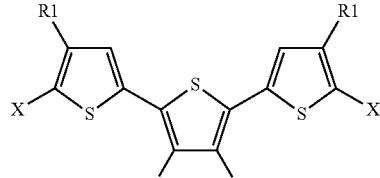   IIe

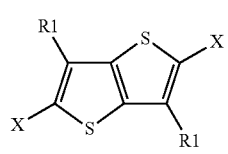   IIf

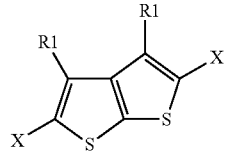   IIg

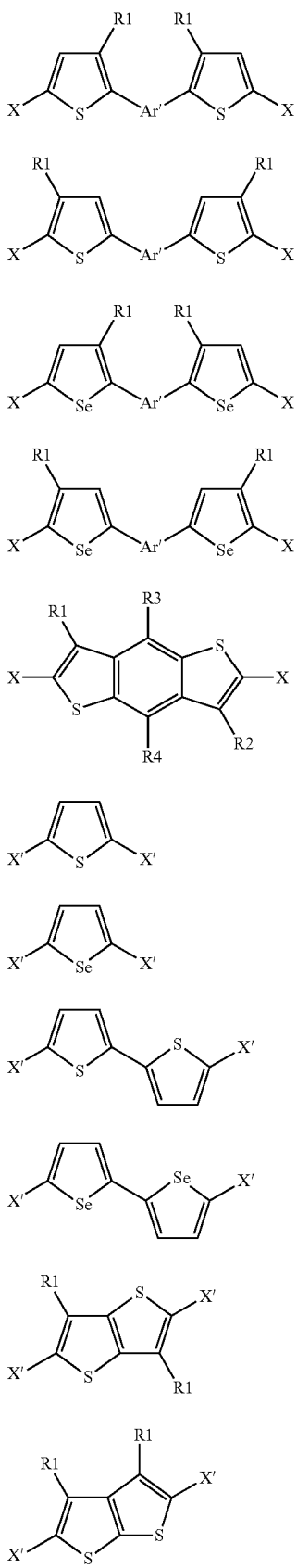

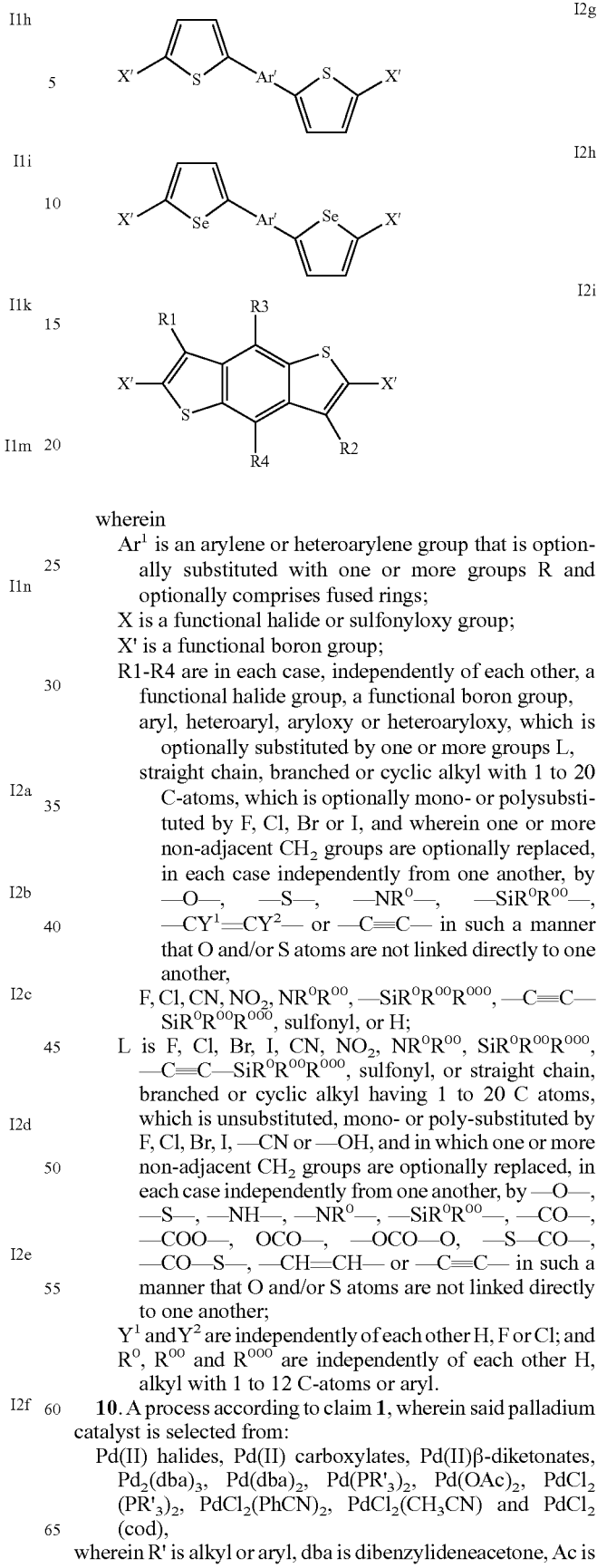

wherein
Ar¹ is an arylene or heteroarylene group that is optionally substituted with one or more groups R and optionally comprises fused rings;
X is a functional halide or sulfonyloxy group;
X' is a functional boron group;
R1-R4 are in each case, independently of each other, a functional halide group, a functional boron group, aryl, heteroaryl, aryloxy or heteroaryloxy, which is optionally substituted by one or more groups L, straight chain, branched or cyclic alkyl with 1 to 20 C-atoms, which is optionally mono- or polysubstituted by F, Cl, Br or I, and wherein one or more non-adjacent $CH_2$ groups are optionally replaced, in each case independently from one another, by —O—, —S—, —NR$^o$—, —SiR$^o$R$^{oo}$—, —CY$^1$=CY$^2$— or —C≡C— in such a manner that O and/or S atoms are not linked directly to one another,
F, Cl, CN, $NO_2$, NR$^o$R$^{oo}$, —SiR$^o$R$^{oo}$R$^{ooo}$, —C≡C—SiR$^o$R$^{oo}$R$^{ooo}$, sulfonyl, or H;
L is F, Cl, Br, I, CN, $NO_2$, NR$^o$R$^{oo}$, SiR$^o$R$^{oo}$R$^{ooo}$, —C≡C—SiR$^o$R$^{oo}$R$^{ooo}$, sulfonyl, or straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —NR$^o$—, —SiR$^o$R$^{oo}$—, —CO—, —COO—, OCO—, —OCO—O, —S—CO—, —CO—S—, —CH=CH— or —C≡C— in such a manner that O and/or S atoms are not linked directly to one another;
Y$^1$ and Y$^2$ are independently of each other H, F or Cl; and
R$^o$, R$^{oo}$ and R$^{ooo}$ are independently of each other H, alkyl with 1 to 12 C-atoms or aryl.

10. A process according to claim 1, wherein said palladium catalyst is selected from:
Pd(II) halides, Pd(II) carboxylates, Pd(II)β-diketonates, $Pd_2(dba)_3$, $Pd(dba)_2$, $Pd(PR'_3)_2$, $Pd(OAc)_2$, $PdCl_2(PR'_3)_2$, $PdCl_2(PhCN)_2$, $PdCl_2(CH_3CN)$ and $PdCl_2(cod)$,
wherein R' is alkyl or aryl, dba is dibenzylideneacetone, Ac is acetate, PhCN is benzonitrile, and cod is 1,5-cyclooctadiene.

11. A process according to claim 1, wherein said trisubstituted phosphonium salt is selected from the formula [$R^a_x R^b_y R^c_z PH$]$^+ Z^-$, wherein $R^a$, $R^b$ and $R^c$ are each identical or different straight-chain, branched or cyclic alkyl groups with 1 to 12 C atoms that are optionally fluorinated, x, y and z are 0, 1, 2 or 3, wherein x+y+z=3, and $Z^-$ is a suitable anion.

12. A process according to claim 11, wherein $Z^-$ is $BF_4^-$, $PF_6^-$ or $SbF_6^-$.

13. A process according to claim 1, wherein said base is selected from alkali metal hydroxides, alkaline earth metal hydroxides, carboxylates, carbonates, fluorides and phosphates.

14. A process according to claim 13, wherein said base is aqueous $K_2CO_3$ or $Na_2CO_3$.

15. A process according to claim 1, wherein at least 1.5 equivalents of said base per functional boron group is present in the reaction mixture.

16. A process according to claim 1, wherein said solvent or solvent mixture is selected from toluene, xylene, anisole, tetrahydrofuran, 2-methyl-tetrahydrofuran, dioxane, chlorobenzene, fluorobenzene, and mixtures of two or more of these solvents.

17. A process according to claim 7, wherein $Ar^2$ is a mono-, bi- or tricyclic aromatic or heteroaromatic group with up to 25 C atoms, wherein the rings can be fused, and in which the heteroaromatic group contains at least one hetero atom selected from N, O and S, and which is optionally substituted with one or more groups selected from F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —NR$^0$—, —SiR$^0$R$^{00}$—, —CO—, —COO—, OCO—, —OCO—O, —S—CO—, —CO—S—, —CH═CH— or —C≡C— in such a manner that O and/or S atoms are not linked directly to one another.

18. A process according to claim 8, wherein $Ar^2$ is a mono-, bi- or tricyclic aromatic or heteroaromatic group with up to 25 C atoms, wherein the rings can be fused, and in which the heteroaromatic group contains at least one hetero atom selected from N, O and S, and which is optionally substituted with one or more groups selected from F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —NR$^0$—, —SiR$^0$R$^{00}$—, —CO—, —COO—, OCO—, —OCO—O, —S—CO—, —CO—S—, —CH═CH— or —C≡C— in such a manner that O and/or S atoms are not linked directly to one another.

19. A process according to claim 7, wherein $Ar^1$ and $Ar^3$ groups that are not linked to $X^1$ or $X^2$ are each a mono-, bi- or tricyclic aromatic or heteroaromatic group with up to 25 C atoms, wherein the rings can be fused, and in which the heteroaromatic group contains at least one hetero atom selected from N, O and S, and which is optionally substituted with one or more groups selected from F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —NR$^0$—, —SiR$^0$R$^{00}$—, —CO—, —COO—, OCO—, —OCO—O, —S—CO—, —CO—S—, —CH═CH— or —C≡C— in such a manner that O and/or S atoms are not linked directly to one another.

20. A process according to claim 7, wherein $Ar^2$ and $Ar^1$ and $Ar^3$ groups that are not linked to $X^1$ or $X^2$ are each independently phenylene, phenylene in which one or more CH groups is replaced by N, or naphthalene, fluorene, oxazole, thiophene, selenophene, or dithienothiophene, which in each case is optionally mono- or polysubstituted with L.

21. A process according to claim 20, wherein $Ar^2$ and $Ar^1$ and $Ar^3$ groups that are not linked to $X^1$ or $X^2$ are each independently 1,4-phenylene-1,4-diyl, pyridine-2,5-diyl, pyrimidine-2,5-diyl, 1,1'-biphenyl-4,4'-diyl, naphthalene-2,6-diyl, thiophene-2,5-diyl, selenophene-2,5-diyl, thiophene-2,5-diyl or selenophene-2,5-diyl, fluorene-2,7-diyl, 2,2'-dithiophene-5,5'-diyl, thieno[2,3-b]thiophene-2,5-diyl, thieno[3,2-b]thiophene-2,5-diyl, benzo[1,2-b:4,5-b']dithiophene-2,6-diyl, thiazole-2,5-diyl, thiadiazole-2,5-diyl, thieno[2,3-d]thiazole-4,6-diyl, thieno[2,3-d]thiazole-6,4-diyl, oxazole-2,5-diyl and oxadiazole-2,5-diyl, which in each case is unsubstituted, or optionally fluorinated, alkylated, or mono- or polysubstituted with L.

22. A process according to claim 7, wherein b is 0.

23. A process according to claim 7, wherein:

a+c is 1, 2 or 3 and $Ar^1$ and $Ar^3$ are selected from thiophene-2,5-diyl that is optionally substituted in 3- and/or 4-position;

a+c is 1, 2 or 3 and $Ar^1$ and $Ar^3$ are selected from selenophene-2,5-diyl that is optionally substituted in 3- and/or 4-position, a+c is 1 and $Ar^1$, or $Ar^3$ respectively, is thieno[2,3-b]thiophene-2,5-diyl that is optionally substituted in 3- and/or 4-position, a+c is 1 and $Ar^1$, or $Ar^3$ respectively, is thieno[3,2-b]thiophene-2,5-diyl that is optionally substituted in 3- and/or 6-position, or a+c is 1 and $Ar^1$, or $Ar^3$ respectively, is benzo[1,2-b:4,5-b']dithiophene-2,6-diyl that is optionally substituted in 3- and/or 6-position.

24. A process according to claim 7, wherein $X^1$ and $X^2$ are each Br and I.

25. A process according to claim 7, wherein when any one of R, R$^0$, R$^{00}$, R$^{000}$, $R^1$ or $R^2$ is aryl or heteroaryl, or if R is aryloxy or heteroaryloxy, the aryl or heteroaryl group is a mono-, bi- or tricyclic aromatic or heteroaromatic group with up to 25 C atoms, wherein the rings can be fused, and in which the heteroaryl group contains at least one hetero ring atom selected from N, O and S, and is optionally substituted with one or more groups L.

26. A process according to claim 7, wherein $Ar^1$ and $Ar^3$ are each thiophene-2,5-diyl, selenophene-2,5-diyl, 2,2'-dithiophene-5,5'-diyl, thieno[2,3-b]thiophene-2,5-diyl, thieno[3,2-b]thiophene-2,5-diyl, and benzo[1,2-b:4,5-b']dithiophene-2,6-diyl, all of which are unsubstituted or substituted by R;

$Ar^2$ is a mono-, bi- or tricyclic aromatic or heteroaromatic group with up to 25 C atoms, wherein the rings can be fused, and in which the heteroaromatic group contains at least one hetero atom selected from N, O and S, and which is optionally substituted with one or more groups selected from F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are each optionally replaced, in each case independently from one another, by —O—, —S—, —NH—, —NR$^O$—, —SiR$^O$R$^{OO}$—, —CO—, —COO—, —OCO—, —OCO—O, —S—CO—, —CO—S—, —CH=CH— or —C≡C— in such a manner that O and/or S atoms are not linked directly to one another;

X$^1$ and X$^2$ are independently of each other Br, I, or a boron group are of the formula —B(OR')(OR'') or BR'R'', wherein R' and R'' are independently of each other H or alkyl having 1 to 12 C-atoms, or R' and R'' together form an alkylene or arylene group having 2 to 20 C atoms;

R is Br, I, or a boron group are of the formula —B(OR')(OR'') or BR'R'', wherein R' and R'' are independently of each other H or alkyl having 1 to 12 C-atoms, or R' and R'' together form an alkylene or arylene group having 2 to 20 C atoms, or R is aryl, heteroaryl, aryloxy or heteroaryloxy, which is optionally substituted by one or more groups L, wherein the aryl or heteroaryl portion is a mono-, bi- or tricyclic aromatic or heteroaromatic group with up to 25 C atoms, and the heteroaryl portion contains at least one hetero ring atom selected from N, O and S, or R is straight chain, branched or cyclic alkyl with 1 to 20 C-atoms, which is optionally mono- or polysubstituted by F, Cl, Br or I, and wherein one or more non-adjacent CH$_2$ groups are optionally replaced, in each case independently from one another, by —O—, —S—, —NR$^O$—, —SiR$^O$R$^{OO}$—, —CY$^1$=CY$^2$— or —C≡C— in such a manner that O and/or S atoms are not linked directly to one another, or R is F, Cl, CN, NO$_2$, NR$^O$R$^{OO}$, —SiR$^O$R$^{OO}$R$^{OOO}$, —C≡C— SiR$^O$R$^{OO}$R$^{OOO}$, sulfonyl, or H.

27. A process according to claim 7, wherein a heteroaromatic compound of Formula (I) having at least one functional halide group and at least one functional boron group is polymerized, and wherein X$^1$ is a functional halide.

28. A process according to claim 7, wherein a first heteroaromatic compound of Formula (I) wherein X$^1$ and X$^2$ are each a halide group is copolymerized with a second heteroaromatic compound of Formula (I) wherein X$^1$ and X$^2$ are functional boron groups.

29. A process according to claim 26, wherein a heteroaromatic compound of Formula (I) having at least one functional halide group and at least one functional boron group is polymerized, and wherein X$^1$ is a functional halide.

30. A process according to claim 26, wherein a first heteroaromatic compound of Formula (I) wherein X$^1$ and X$^2$ are each a halide group is copolymerized with a second heteroaromatic compound of Formula (I) wherein X$^1$ and X$^2$ are functional boron groups.

31. A process according to claim 16, wherein said solvent or solvent mixture is tetrahydrofuran or a mixture of tetrahydrofuran and toluene.

32. A process according to claim 1, wherein said palladium catalyst, before forming the catalyst/ligand system, is a phosphine-free catalyst.

33. A process according to claim 11, wherein in the formula R$^a_x$R$^b_y$R$^c_z$PH]$^+$Z$^-$ the groups R$^a$, R$^b$, and R$^c$ are identical, or R$^a$ and R$^c$ are the same and R$^b$ are different.

34. A process according to claim 11, wherein said R$^a$, R$^b$, and R$^c$ are each ethyl, iso-propyl, cyclohexyl, or tert-butyl, or two of R$^a$, R$^b$, and R$^c$-tert-butyl and the other is methyl.

35. A process according to claim 11, wherein said trisubstituted phosphonium is tri-tert-butylphosphonium tetrafluoroborate.

36. A process according to claim 1, wherein the polymer resulting from the polymerization or copolymerization reaction has a molecular weight, M$_n$, of greater than 20,000 Da.

37. A process according to claim 1, wherein the polymer resulting from the polymerization or copolymerization reaction has a degree of polymerisation of at least 20.

38. A process according to claim 1, wherein the polymer resulting from the polymerization or copolymerization reaction has a degree of polymerisation of at least 50.

39. A process according to claim 1, wherein the polymer resulting from the polymerization or copolymerization reaction has a degree of polymerisation of at least 100.

40. A process according to claim 1, wherein the polymer resulting from the polymerization or copolymerization reaction has a molecular weight of at least 10,000 g mol$^{-1}$.

41. A process according to claim 1, wherein the polymer resulting from the polymerization or copolymerization reaction has a molecular weight of at least 25,000 g mol$^{-1}$.

42. A process according to claim 1, wherein the polymer resulting from the polymerization or copolymerization reaction has a molecular weight of at least 50,000 g mol$^{-1}$.

43. A process according to claim 1, wherein the amount of palladium catalyst used is 0.01 to 5 mol. %, based on the equivalents of the heteraromatic compound(s) used.

44. A process according to claim 1, wherein the amount of palladium catalyst used is 0.01 to 1 mol. %, based on the equivalents of the heteraromatic compound(s) used.

45. A process according to claim 1, wherein the amount of phosphonium salt used is 0.02 to 10 mol. %, based on the equivalents of the heteraromatic compound(s) used.

46. A process according to claim 1, wherein the amount of phosphonium salt used is 0.02 to 2 mol. %, based on the equivalents of the heteraromatic compound(s) used.

47. A process according to claim 1, wherein the polymer resulting from the polymerization or copolymerization reaction is:
poly(2,5-bis(3-decylthiophen-2-yl)thieno[2,3-b]thiophene),
poly(2,5-bis(3-dodecylthiophen-2-yl)thieno[2,3-b]thiophene,
poly(2,5-bis(3-decylthiophen-2-yl)thiophene),
poly(3-hexylthiophene),
poly(3,6-didodecylthieno[3,2-b]thiophene-alt-2,5-thiophene), or
poly(3,6-dihexadecylthieno[3,2-b]thiophene-alt-5,5'-bithiophene).

* * * * *